(12) United States Patent
Elshafie et al.

(10) Patent No.: US 11,758,483 B2
(45) Date of Patent: Sep. 12, 2023

(54) OPTIMIZED UPLINK TRANSMIT POWER THROUGH DEVICE COORDINATION FOR IMPROVED HUMAN DETECTION

(71) Applicant: QUALCOMM Incorporated, San Diego, CA (US)

(72) Inventors: Ahmed Elshafie, San Diego, CA (US); Ahmad Bassil Zoubi, San Diego, CA (US); Danlu Zhang, Rancho Santa Fe, CA (US); Bala Ramasamy, San Marcos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 159 days.

(21) Appl. No.: 17/470,181

(22) Filed: Sep. 9, 2021

(65) Prior Publication Data
US 2023/0070589 A1  Mar. 9, 2023

(51) Int. Cl.
| | |
|---|---|
| H04W 4/38 | (2018.01) |
| H04W 52/14 | (2009.01) |
| H04B 1/3827 | (2015.01) |
| H04L 5/00 | (2006.01) |
| H04W 72/044 | (2023.01) |

(52) U.S. Cl.
CPC ........ H04W 52/146 (2013.01); H04B 1/3838 (2013.01); H04L 5/0055 (2013.01); H04W 4/38 (2018.02); H04W 72/0473 (2013.01)

(58) Field of Classification Search
CPC ....... H04W 64/00; H04W 40/02; H04W 4/38; H04W 4/029
See application file for complete search history.

(56) References Cited

U.S. PATENT DOCUMENTS

2010/0328074 A1  12/2010  Johnson et al.
2017/0279899 A1  9/2017  Jain et al.
(Continued)

FOREIGN PATENT DOCUMENTS

EP    3691342 A1    8/2020
WO    2020164758 A1    8/2020
(Continued)

OTHER PUBLICATIONS

International Search Report and Written Opinion—PCT/US2022/073319—ISA/EPO—dated Oct. 14, 2022.

*Primary Examiner* — Tu X Nguyen
(74) *Attorney, Agent, or Firm* — Muncy, Geissler, Olds & Lowe, P.C./Qualcomm

(57) ABSTRACT

Disclosed are techniques for wireless communication. In an aspect, a first wireless device transmits a request to participate in a coordination and detection procedure to determine whether a human is present in an environment of the first wireless device, receives an acknowledgment from at least a second wireless device, transmits a first set of at least two consecutive wireless signals to the second wireless device, receives a second set of at least two consecutive wireless signals from the second wireless device, determines whether the human is present in the environment based at least in part on a first time of flight (ToF) and a second ToF between the first wireless device and the second wireless device, and sets a transmit power of the first wireless device based on the determination of whether the human is present in the environment.

17 Claims, 14 Drawing Sheets

(56) References Cited

U.S. PATENT DOCUMENTS

2020/0084569 A1    3/2020  Jain et al.
2022/0026519 A1*  1/2022  Wu ........................ G01S 7/006
2023/0076030 A1*  3/2023  Baek .................... G01S 13/876

FOREIGN PATENT DOCUMENTS

| WO | 2021007293 A1 | 1/2021 |
| WO | 2021081312 | 4/2021 |
| WO | 2021173213 | 9/2021 |

\* cited by examiner

OPTIMIZED UPLINK TRANSMIT POWER THROUGH DEVICE COORDINATION FOR IMPROVED HUMAN DETECTION

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless communication performed by a first wireless device includes transmitting a request to participate in a coordination and detection procedure to determine whether a human is present in an environment of the first wireless device; receiving an acknowledgment from at least a second wireless device indicating that the second wireless device will participate in the coordination and detection procedure; transmitting a first set of at least two consecutive wireless signals to the second wireless device; receiving a second set of at least two consecutive wireless signals from the second wireless device; determining whether the human is present in the environment based at least in part on a first time of flight (ToF) and a second ToF between the first wireless device and the second wireless device, the first ToF determined based on a first wireless signal of the first set of at least two consecutive wireless signals and a first wireless signal of the second set of at least two consecutive wireless signals, the second ToF determined based on a second wireless signal of the first set of at least two consecutive wireless signals and a second wireless signal of the second set of at least two consecutive wireless signals; and setting a transmit power of the first wireless device based on the determination of whether the human is present in the environment.

In an aspect, a method of wireless communication performed by a base station includes receiving, from a first wireless device, a request for assistance with a detection procedure to determine whether a human is present in an environment of the first wireless device; receiving, from a third wireless device, a first time of flight (ToF) and a second ToF between the first wireless device and a second wireless device, the first ToF determined based on a first wireless signal of a first pair of consecutive wireless signals transmitted by the first wireless device and a first wireless signal of a second pair of consecutive wireless signals transmitted by the second wireless device, the second ToF determined based on a second wireless signal of the first pair of consecutive wireless signals transmitted by the first wireless device and a second wireless signal of the second pair of consecutive wireless signals transmitted by the second wireless device; determining whether the human is present in the environment based at least in part on the first ToF and the second ToF; and transmitting, to at least the third wireless device, a result of the determination of whether the human is present in the environment.

In an aspect, a first wireless device includes a memory; at least one transceiver; and at least one processor communicatively coupled to the memory and the at least one transceiver, the at least one processor configured to: transmit, via the at least one transceiver, a request to participate in a coordination and detection procedure to determine whether a human is present in an environment of the first wireless device; receive, via the at least one transceiver, an acknowledgment from at least a second wireless device indicating that the second wireless device will participate in the coordination and detection procedure; transmit, via the at least one transceiver, a first set of at least two consecutive wireless signals to the second wireless device; receive, via the at least one transceiver, a second set of at least two consecutive wireless signals from the second wireless device; determine whether the human is present in the environment based at least in part on a first time of flight (ToF) and a second ToF between the first wireless device and the second wireless device, the first ToF determined based on a first wireless signal of the first set of at least two consecutive wireless signals and a first wireless signal of the second set of at least two consecutive wireless signals, the second ToF determined based on a second wireless signal of the first set of at least two consecutive wireless signals and a second wireless signal of the second set of at least two consecutive wireless signals; and set a transmit power of the first wireless device based on the determination of whether the human is present in the environment.

In an aspect, a base station includes a memory; at least one transceiver; and at least one processor communicatively coupled to the memory and the at least one transceiver, the at least one processor configured to: receive, via the at least one transceiver, from a first wireless device, a request for assistance with a detection procedure to determine whether a human is present in an environment of the first wireless device; receive, via the at least one transceiver, from a third wireless device, a first time of flight (ToF) and a second ToF between the first wireless device and a second wireless device, the first ToF determined based on a first wireless signal of a first pair of consecutive wireless signals transmitted by the first wireless device and a first wireless signal of a second pair of consecutive wireless signals transmitted by the second wireless device, the second ToF determined based on a second wireless signal of the first pair of consecutive wireless signals transmitted by the first wireless device and a second wireless signal of the second pair of consecutive wireless signals transmitted by the second wireless device; determine whether the human is present in the environment based at least in part on the first ToF and the second ToF; and transmit, via the at least one transceiver, to at least the third wireless device, a result of the determination of whether the human is present in the environment.

In an aspect, a first wireless device includes means for transmitting a request to participate in a coordination and detection procedure to determine whether a human is present in an environment of the first wireless device; means for receiving an acknowledgment from at least a second wireless device indicating that the second wireless device will participate in the coordination and detection procedure; means for transmitting a first set of at least two consecutive wireless signals to the second wireless device; means for receiving a second set of at least two consecutive wireless signals from the second wireless device; means for determining whether the human is present in the environment based at least in part on a first time of flight (ToF) and a second ToF between the first wireless device and the second wireless device, the first ToF determined based on a first wireless signal of the first set of at least two consecutive wireless signals and a first wireless signal of the second set of at least two consecutive wireless signals, the second ToF determined based on a second wireless signal of the first set of at least two consecutive wireless signals and a second wireless signal of the second set of at least two consecutive wireless signals; and means for setting a transmit power of the first wireless device based on the determination of whether the human is present in the environment.

In an aspect, a base station includes means for receiving, from a first wireless device, a request for assistance with a detection procedure to determine whether a human is present in an environment of the first wireless device; means for receiving, from a third wireless device, a first time of flight (ToF) and a second ToF between the first wireless device and a second wireless device, the first ToF determined based on a first wireless signal of a first pair of consecutive wireless signals transmitted by the first wireless device and a first wireless signal of a second pair of consecutive wireless signals transmitted by the second wireless device, the second ToF determined based on a second wireless signal of the first pair of consecutive wireless signals transmitted by the first wireless device and a second wireless signal of the second pair of consecutive wireless signals transmitted by the second wireless device; means for determining whether the human is present in the environment based at least in part on the first ToF and the second ToF; and means for transmitting, to at least the third wireless device, a result of the determination of whether the human is present in the environment.

In an aspect, a non-transitory computer-readable medium storing computer-executable instructions that, when executed by a first wireless device, cause the first wireless device to: transmit a request to participate in a coordination and detection procedure to determine whether a human is present in an environment of the first wireless device; receive an acknowledgment from at least a second wireless device indicating that the second wireless device will participate in the coordination and detection procedure; transmit a first set of at least two consecutive wireless signals to the second wireless device; receive a second set of at least two consecutive wireless signals from the second wireless device; determine whether the human is present in the environment based at least in part on a first time of flight (ToF) and a second ToF between the first wireless device and the second wireless device, the first ToF determined based on a first wireless signal of the first set of at least two consecutive wireless signals and a first wireless signal of the second set of at least two consecutive wireless signals, the second ToF determined based on a second wireless signal of the first set of at least two consecutive wireless signals and a second wireless signal of the second set of at least two consecutive wireless signals; and set a transmit power of the first wireless device based on the determination of whether the human is present in the environment.

In an aspect, a non-transitory computer-readable medium storing computer-executable instructions that, when executed by a base station, cause the base station to: receive, from a first wireless device, a request for assistance with a detection procedure to determine whether a human is present in an environment of the first wireless device; receive, from a third wireless device, a first time of flight (ToF) and a second ToF between the first wireless device and a second wireless device, the first ToF determined based on a first wireless signal of a first pair of consecutive wireless signals transmitted by the first wireless device and a first wireless signal of a second pair of consecutive wireless signals transmitted by the second wireless device, the second ToF determined based on a second wireless signal of the first pair of consecutive wireless signals transmitted by the first wireless device and a second wireless signal of the second pair of consecutive wireless signals transmitted by the second wireless device; determine whether the human is present in the environment based at least in part on the first ToF and the second ToF; and transmit, to at least the third wireless device, a result of the determination of whether the human is present in the environment.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
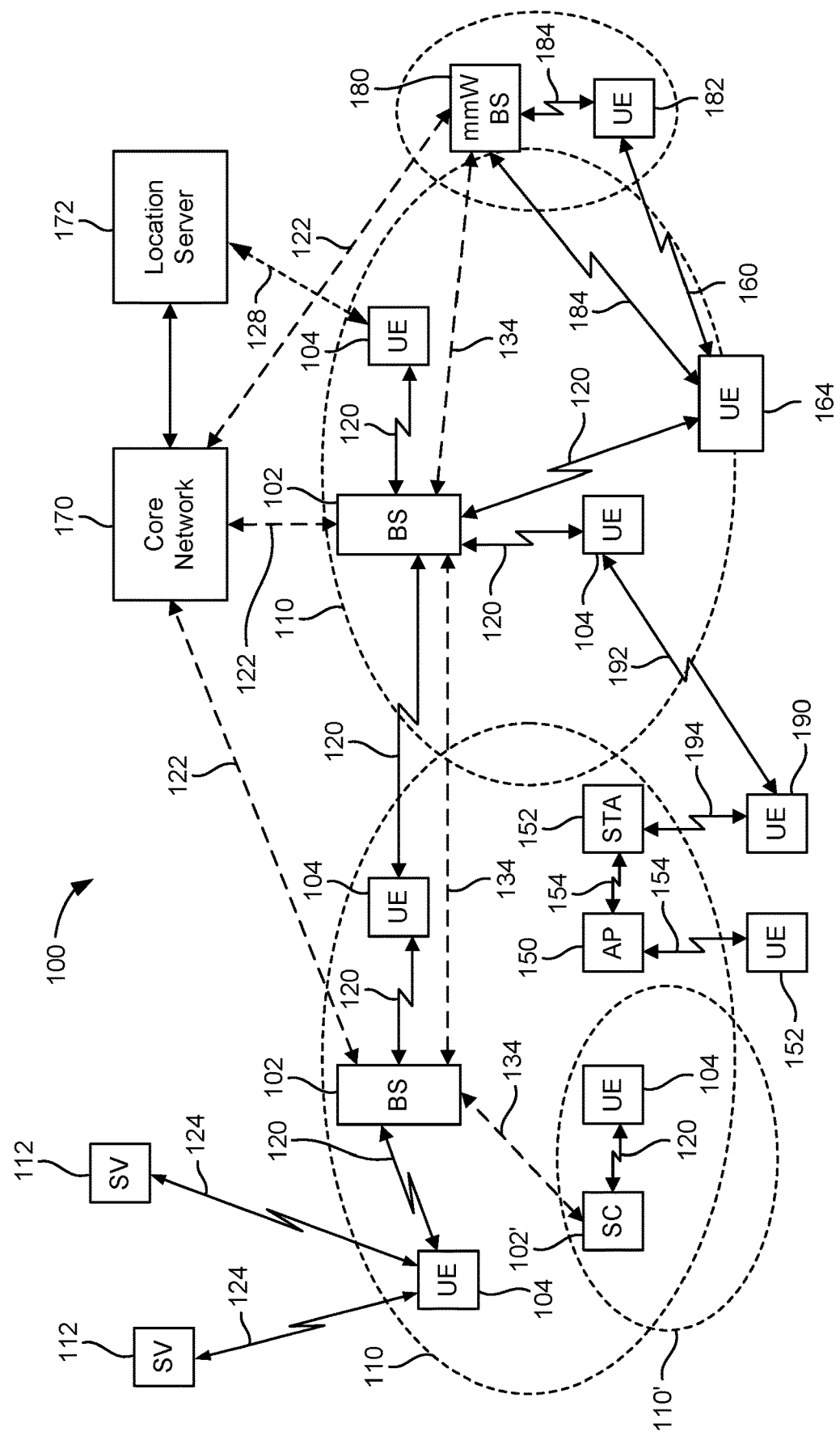
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base stations may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. A location server 172 may be integrated with a base station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a wireless local area network (WLAN) access point (AP) (e.g., AP 150 described below), and so on. For signaling purposes, communication between a UE 104 and a location server 172 may be represented as an indirect connection (e.g., through the core network 170, etc.) or a direct connection (e.g., as shown via direct connection 128), with the intervening nodes (if any) omitted from a signaling diagram for clarity.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

The electromagnetic spectrum is often subdivided, based on frequency/wavelength, into various classes, bands, channels, etc. In 5G NR two initial operating bands have been identified as frequency range designations FR1 (410 MHz- 7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In some cases, the UE 164 and the UE 182 may be capable of sidelink communication. Sidelink-capable UEs (SL-UEs) may communicate with base stations 102 over communication links 120 using the Uu interface (i.e., the air interface between a UE and a base station). SL-UEs (e.g., UE 164, UE 182) may also communicate directly with each other over a wireless sidelink 160 using the PC5 interface (i.e., the air interface between sidelink-capable UEs). A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, vehicle-to-vehicle (V2V) communication, vehicle-to-everything (V2X) communication (e.g., cellular V2X (cV2X) communication, enhanced V2X (eV2X) communication, etc.), emergency rescue applications, etc. One or more of a group of SL-UEs utilizing sidelink communications may be within the geographic coverage area 110 of a base station 102. Other SL-UEs in such a group may be outside the geographic coverage area 110 of a base station 102 or be otherwise unable to receive transmissions from a base station 102. In some cases, groups of SL-UEs communicating via sidelink communications may utilize a one-to-many (1:M) system in which each SL-UE transmits to every other SL-UE in the group. In some cases, a base station 102 facilitates the scheduling of resources for sidelink communications. In other cases, sidelink communications are carried out between SL-UEs without the involvement of a base station 102.

In an aspect, the sidelink 160 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs. In an aspect, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-MI) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Note that although FIG. 1 only illustrates two of the UEs as SL-UEs (i.e., UEs 164 and 182), any of the illustrated UEs may be SL-UEs. Further, although only UE 182 was described as being capable of beamforming, any of the illustrated UEs, including UE 164, may be capable of beamforming. Where SL-UEs are capable of beamforming, they may beamform towards each other (i.e., towards other SL-UEs), towards other UEs (e.g., UEs 104), towards base stations (e.g., base stations 102, 180, small cell 102', access point 150), etc. Thus, in some cases, UEs 164 and 182 may utilize beamforming over sidelink 160.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
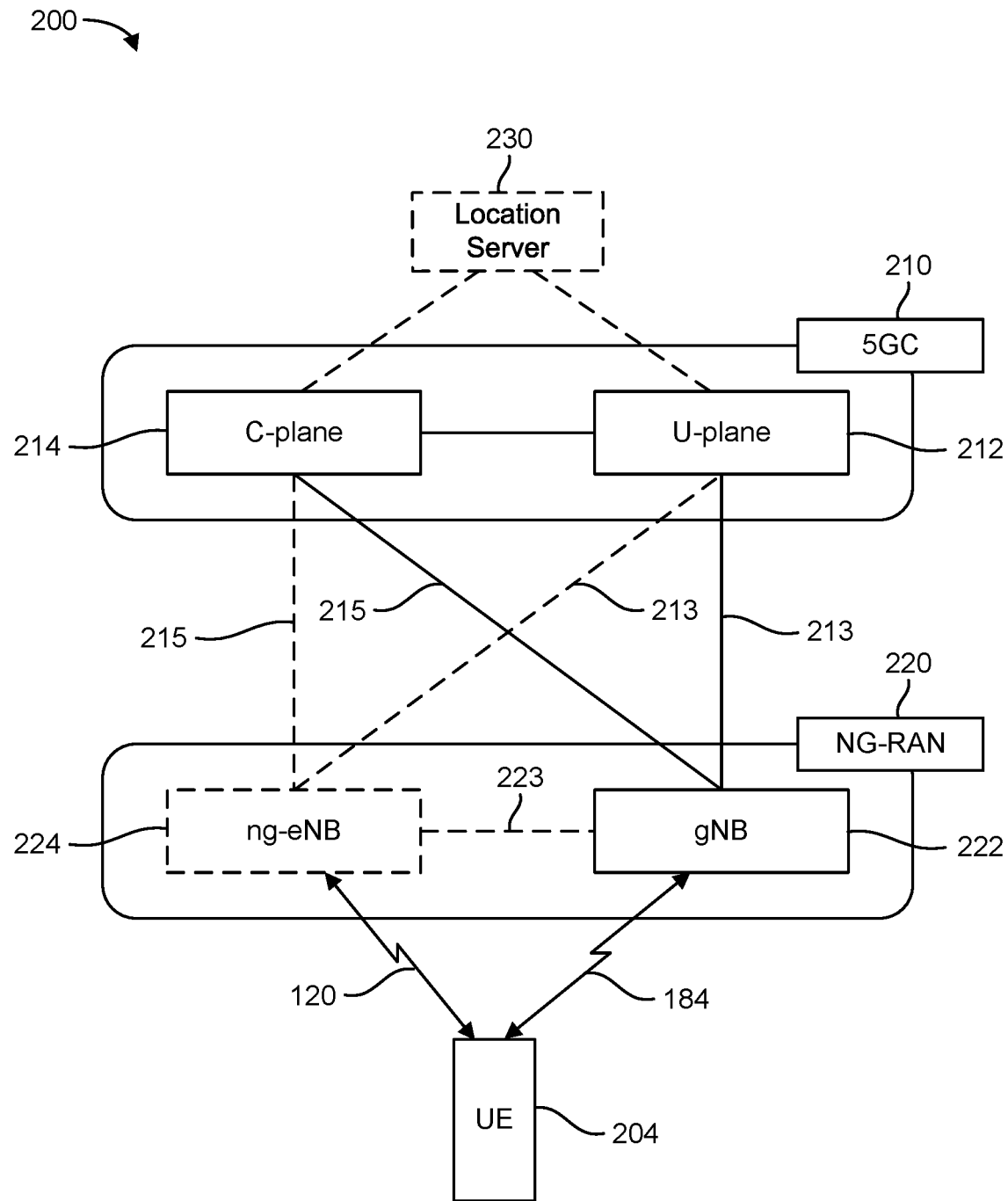
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
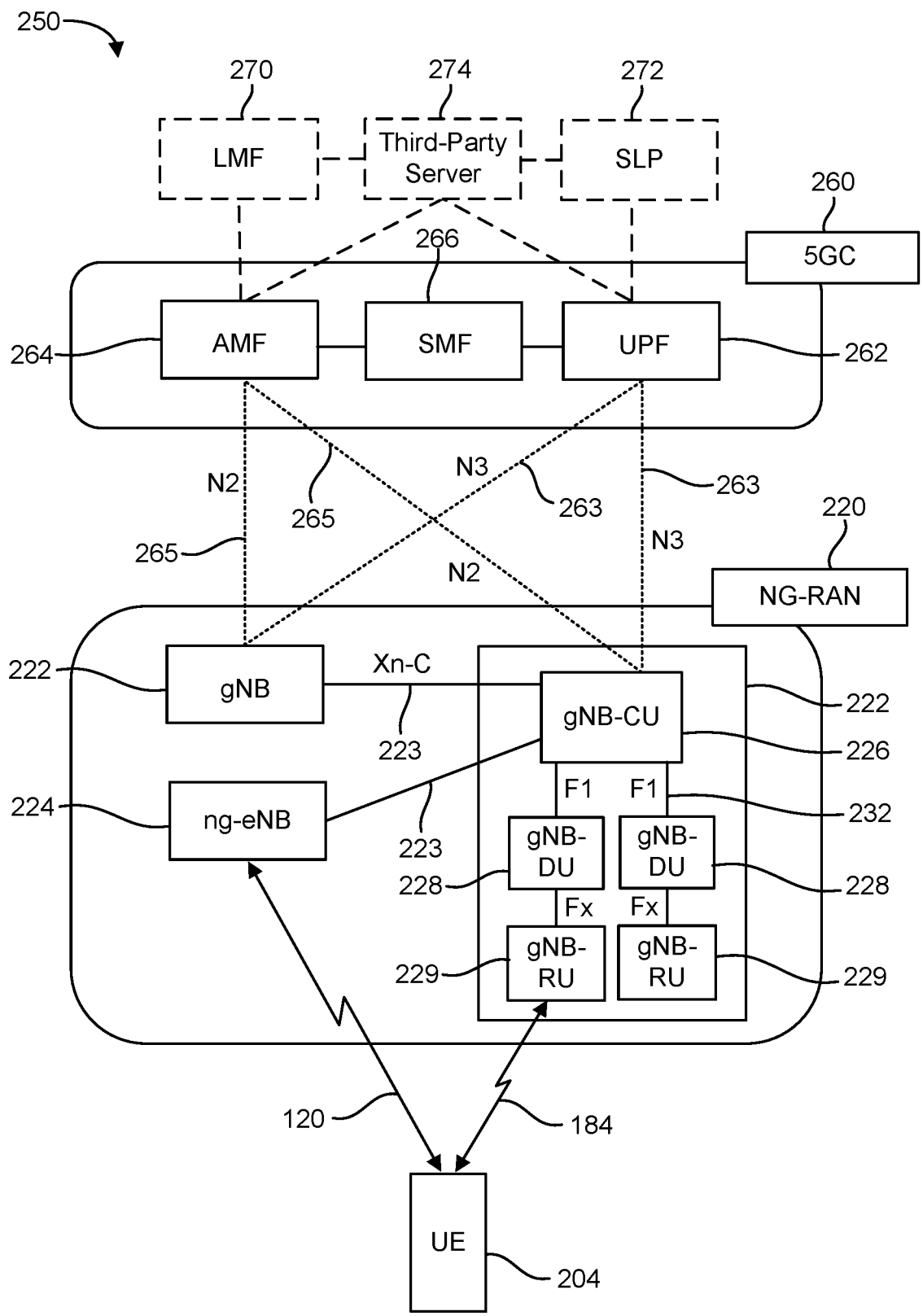

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (e.g., third-party server 274) over a user plane (e.g., using protocols intended to carry voice and/or data like the transmission control protocol (TCP) and/or IP).

Yet another optional aspect may include a third-party server 274, which may be in communication with the LMF 270, the SLP 272, the 5GC 260 (e.g., via the AMF 264 and/or the UPF 262), the NG-RAN 220, and/or the UE 204 to obtain location information (e.g., a location estimate) for the UE 204. As such, in some cases, the third-party server 274 may be referred to as a location services (LCS) client or an external client. The third-party server 274 can be implemented as a plurality of separate servers (e.g., physically separate servers, different software modules on a single server, different software modules spread across multiple physical servers, etc.), or alternately may each correspond to a single server.

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 may be divided between a gNB central unit (gNB-CU) 226, one or more gNB distributed units (gNB-DUs) 228, and one or more gNB radio units (gNB-RUs) 229. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 generally host the radio resource control (RRC), service data adaptation protocol (SDAP), and packet data convergence protocol (PDCP) protocols of the gNB 222. A gNB-DU 228 is a logical node that generally hosts the radio link control (RLC) and medium access control (MAC) layer of the gNB 222. Its operation is controlled by the gNB-CU 226. One gNB-DU 228 can support one or more cells, and one cell is supported by only one gNB-DU 228. The interface 232 between the gNB-CU 226 and the one or more gNB-DUs 228 is referred to as the "F 1" interface. The physical (PHY) layer functionality of a gNB 222 is generally hosted by one or more standalone gNB-RUs 229 that perform functions such as power amplification and signal transmission/reception. The interface between a gNB-DU 228 and a gNB-RU 229 is referred to as the "Fx" interface. Thus, a UE 204 communicates with the gNB-CU 226 via the RRC, SDAP, and PDCP layers, with a gNB-DU 228 via the RLC and MAC layers, and with a gNB-RU 229 via the PHY layer.

Figure 3A:
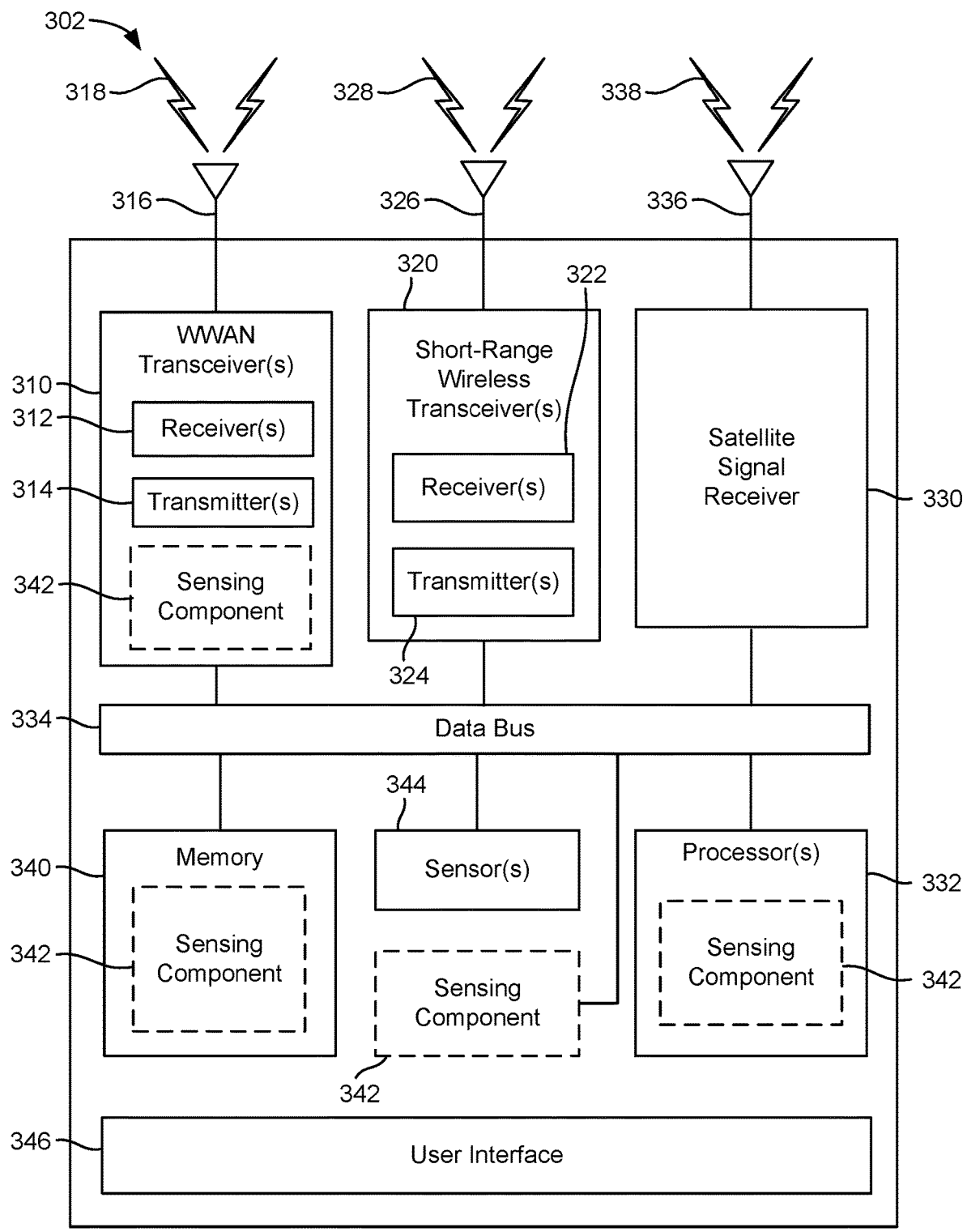
FIGS. 3A, 3B, and 3C are simplified block diagrams of several sample aspects of components that may be employed in a user equipment (UE), a base station, and a network entity, respectively, and configured to support communications as taught herein.
Figure 3B:
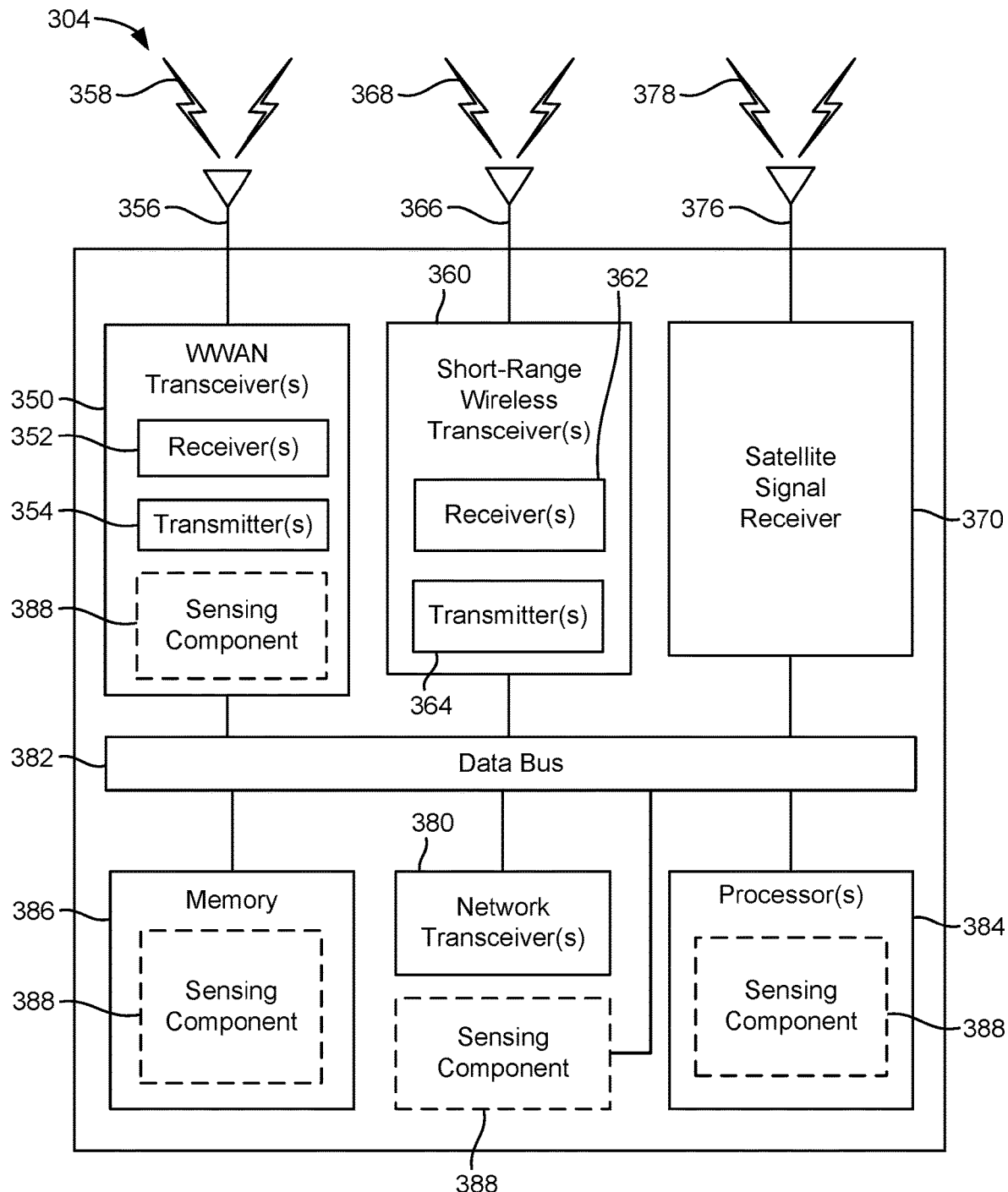
Figure 3C:
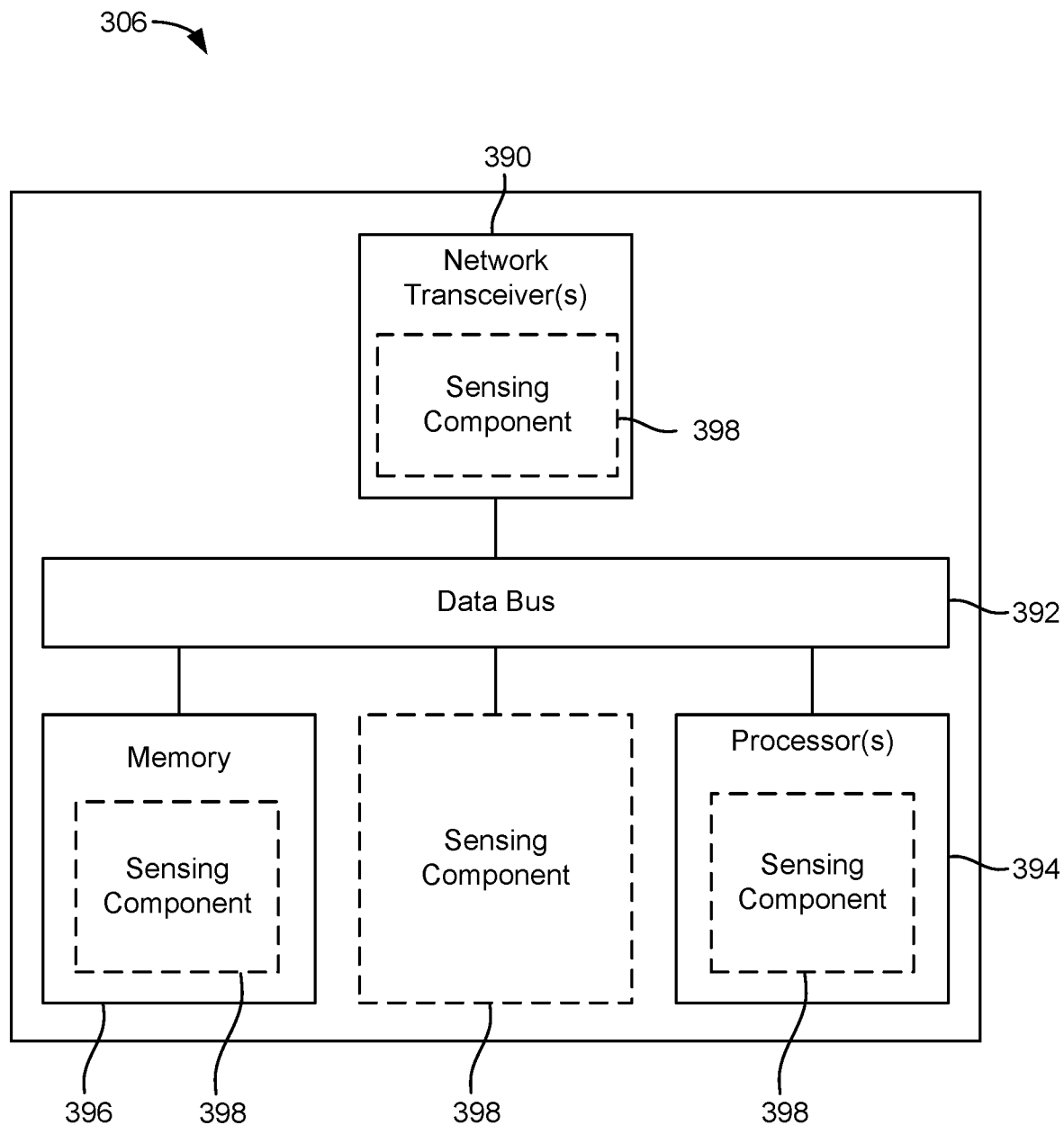

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include sensing component 342, 388, and 398, respectively. The sensing component 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the sensing component 342, 388, and 398 may be external to the processors 332, 384, and 394 (e.g., part of a modem processing system, integrated with another processing system, etc.). Alternatively, the sensing component 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the sensing component 342, which may be, for example, part of the one or more WWAN transceivers 310, the memory 340, the one or more processors 332, or any combination thereof, or may be a standalone component. FIG. 3B illustrates possible locations of the sensing component 388, which may be, for example, part of the one or more WWAN transceivers 350, the memory 386, the one or more processors 384, or any combination thereof, or may be a standalone component. FIG. 3C illustrates possible locations of the sensing component 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a microelectrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the uplink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARD), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have Wi-Fi and/or Bluetooth capability without cellular capability), or may omit the short-range wireless transceiver(s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the sensing component 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

Figure 4:
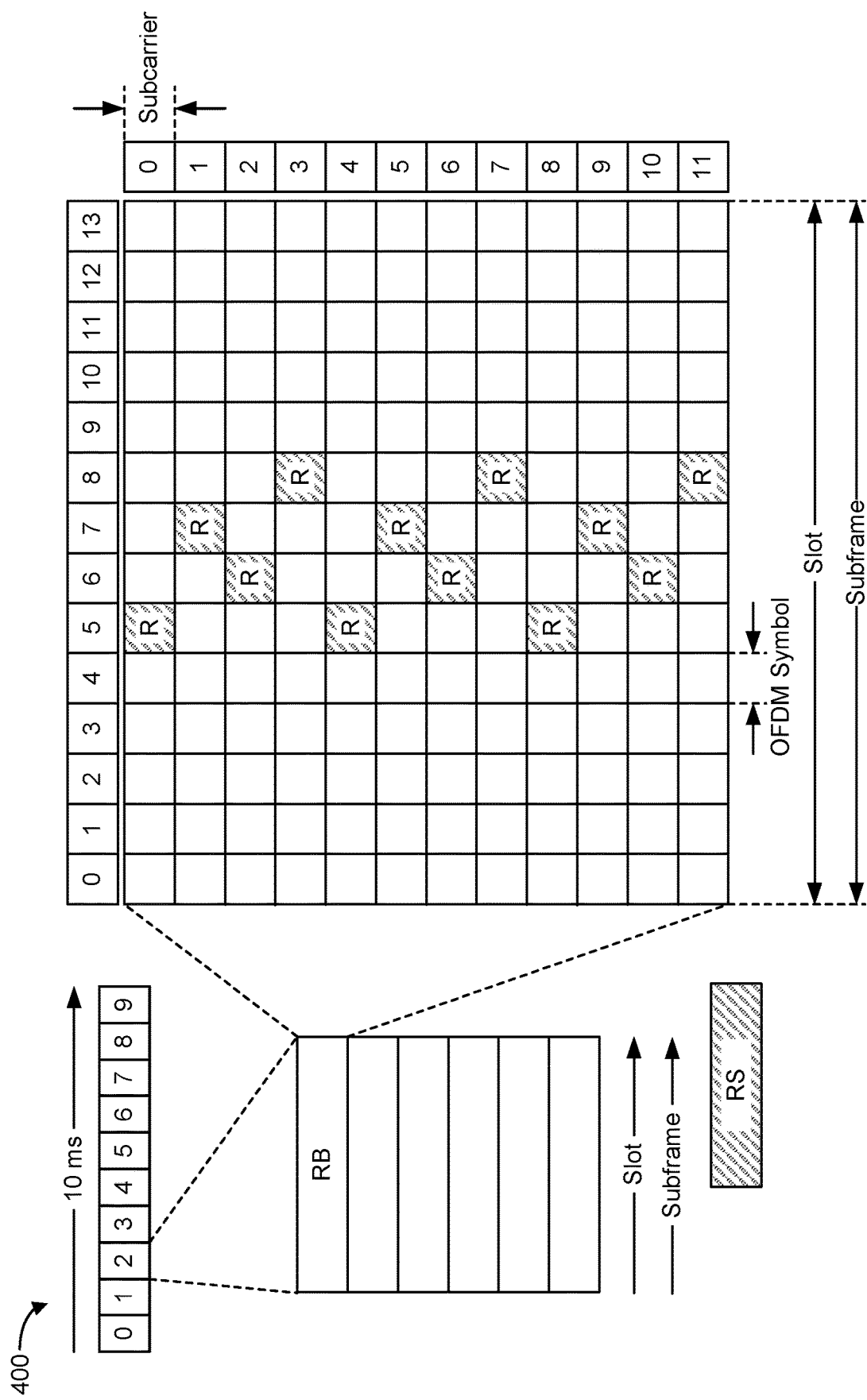
FIG. 4 is a diagram illustrating an example frame structure, according to aspects of the disclosure.

Various frame structures may be used to support downlink and uplink transmissions between network nodes (e.g., base stations and UEs). FIG. 4 is a diagram 400 illustrating an example frame structure, according to aspects of the disclosure. The frame structure may be a downlink or uplink frame structure. Other wireless communications technologies may have different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kilohertz (kHz) and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing (SCS), symbol length, etc.). In contrast, NR may support multiple numerologies ($\mu$), for example, subcarrier spacings of 15 kHz ($\mu=0$), 30 kHz ($\mu=1$), 60 kHz ($\mu=2$), 120 kHz ($\mu=3$), and 240 kHz ($\mu=4$) or greater may be available. In each subcarrier spacing, there are 14 symbols per slot. For 15 kHz SCS ($\mu=0$), there is one slot per subframe, 10 slots per frame, the slot duration is 1 millisecond (ms), the symbol duration is 66.7 microseconds ($\mu s$), and the maximum nominal system bandwidth (in MHz) with a 4K FFT size is 50. For 30 kHz SCS ($\mu=1$), there are two slots per subframe, 20 slots per frame, the slot duration is 0.5 ms, the symbol duration is 33.3 $\mu s$, and the maximum nominal system bandwidth (in MHz) with a 4K FFT size is 100. For 60 kHz SCS ($\mu=2$), there are four slots per subframe, 40 slots per frame, the slot duration is 0.25 ms, the symbol duration is 16.7 $\mu s$, and the maximum nominal system bandwidth (in MHz) with a 4K FFT size is 200. For 120 kHz SCS ($\mu=3$), there are eight slots per subframe, 80 slots per frame, the slot duration is 0.125 ms, the symbol duration is 8.33 $\mu s$, and the maximum nominal system bandwidth (in MHz) with a 4K FFT size is 400. For 240 kHz SCS ($\mu=4$), there are 16 slots per subframe, 160 slots per frame, the slot duration is 0.0625 ms, the symbol duration is 4.17 $\mu s$, and the maximum nominal system bandwidth (in MHz) with a 4K FFT size is 800.

In the example of FIG. 4, a numerology of 15 kHz is used. Thus, in the time domain, a 10 ms frame is divided into 10 equally sized subframes of 1 ms each, and each subframe includes one time slot. In FIG. 4, time is represented horizontally (on the X axis) with time increasing from left to right, while frequency is represented vertically (on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIG. 4, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

Some of the REs may carry reference (pilot) signals (RS). The reference signals may include positioning reference signals (PRS), tracking reference signals (TRS), phase tracking reference signals (PTRS), cell-specific reference signals (CRS), channel state information reference signals (CSI-RS), demodulation reference signals (DMRS), primary synchronization signals (PSS), secondary synchronization signals (SSS), synchronization signal blocks (SSBs), sounding reference signals (SRS), etc., depending on whether the illustrated frame structure is used for uplink or downlink communication. FIG. 4 illustrates example locations of REs carrying a reference signal (labeled "R").

A collection of resource elements (REs) that are used for transmission of PRS is referred to as a "PRS resource." The collection of resource elements can span multiple PRBs in the frequency domain and 'N' (such as 1 or more) consecutive symbol(s) within a slot in the time domain. In a given OFDM symbol in the time domain, a PRS resource occupies consecutive PRBs in the frequency domain.

The transmission of a PRS resource within a given PRB has a particular comb size (also referred to as the "comb density"). A comb size 'N' represents the subcarrier spacing (or frequency/tone spacing) within each symbol of a PRS resource configuration. Specifically, for a comb size 'N,' PRS are transmitted in every Nth subcarrier of a symbol of a PRB. For example, for comb-4, for each symbol of the PRS resource configuration, REs corresponding to every fourth subcarrier (such as subcarriers 0, 4, 8) are used to transmit PRS of the PRS resource. Currently, comb sizes of comb-2, comb-4, comb-6, and comb-12 are supported for DL-PRS. FIG. 4 illustrates an example PRS resource configuration for comb-4 (which spans four symbols). That is, the locations of the shaded REs (labeled "R") indicate a comb-4 PRS resource configuration.

Currently, a DL-PRS resource may span 2, 4, 6, or 12 consecutive symbols within a slot with a fully frequency-domain staggered pattern. A DL-PRS resource can be configured in any higher layer configured downlink or flexible (FL) symbol of a slot. There may be a constant energy per resource element (EPRE) for all REs of a given DL-PRS resource. The following are the frequency offsets from symbol to symbol for comb sizes 2, 4, 6, and 12 over 2, 4, 6, and 12 symbols. 2-symbol comb-2: {0, 1}; 4-symbol comb-2: {0, 1, 0, 1}; 6-symbol comb-2: {0, 1, 0, 1, 0, 1}; 12-symbol comb-2: {0, 1, 0, 1, 0, 1, 0, 1, 0, 1, 0, 1}; 4-symbol comb-4: {0, 2, 1, 3} (as in the example of FIG. 4); 12-symbol comb-4: {0, 2, 1, 3, 0, 2, 1, 3, 0, 2, 1, 3}; 6-symbol comb-6: {0, 3, 1, 4, 2, 5}; 12-symbol comb-6: {0, 3, 1, 4, 2, 5, 0, 3, 1, 4, 2, 5}; and 12-symbol comb-12: {0, 6, 3, 9, 1, 7, 4, 10, 2, 8, 5, 11}.

A "PRS resource set" is a set of PRS resources used for the transmission of PRS signals, where each PRS resource has a PRS resource ID. In addition, the PRS resources in a PRS resource set are associated with the same TRP. A PRS resource set is identified by a PRS resource set ID and is associated with a particular TRP (identified by a TRP ID). In addition, the PRS resources in a PRS resource set have the same periodicity, a common muting pattern configuration, and the same repetition factor (such as "PRS-ResourceRepetitionFactor") across slots. The periodicity is the time from the first repetition of the first PRS resource of a first PRS instance to the same first repetition of the same first PRS resource of the next PRS instance. The periodicity may have a length selected from $2^\mu*\{4, 5, 8, 10, 16, 20, 32, 40, 64, 80, 160, 320, 640, 1280, 2560, 5120, 10240\}$ slots, with $\mu=0, 1, 2, 3$. The repetition factor may have a length selected from {1, 2, 4, 6, 8, 16, 32} slots.

A PRS resource ID in a PRS resource set is associated with a single beam (or beam ID) transmitted from a single TRP (where a TRP may transmit one or more beams). That is, each PRS resource of a PRS resource set may be transmitted on a different beam, and as such, a "PRS resource," or simply "resource," also can be referred to as a "beam." Note that this does not have any implications on whether the TRPs and the beams on which PRS are transmitted are known to the UE.

A "PRS instance" or "PRS occasion" is one instance of a periodically repeated time window (such as a group of one or more consecutive slots) where PRS are expected to be transmitted. A PRS occasion also may be referred to as a "PRS positioning occasion," a "PRS positioning instance, a "positioning occasion," "a positioning instance," a "positioning repetition," or simply an "occasion," an "instance," or a "repetition."

A "positioning frequency layer" (also referred to simply as a "frequency layer") is a collection of one or more PRS resource sets across one or more TRPs that have the same values for certain parameters. Specifically, the collection of PRS resource sets has the same subcarrier spacing and cyclic prefix (CP) type (meaning all numerologies supported for the physical downlink shared channel (PDSCH) are also supported for PRS), the same Point A, the same value of the downlink PRS bandwidth, the same start PRB (and center frequency), and the same comb-size. The Point A parameter takes the value of the parameter "ARFCN-ValueNR" (where "ARFCN" stands for "absolute radio-frequency channel number") and is an identifier/code that specifies a pair of physical radio channel used for transmission and reception. The downlink PRS bandwidth may have a granularity of four PRBs, with a minimum of 24 PRBs and a maximum of 272 PRBs. Currently, up to four frequency layers have been defined, and up to two PRS resource sets may be configured per TRP per frequency layer.

The concept of a frequency layer is somewhat like the concept of component carriers and bandwidth parts (BWPs), but different in that component carriers and BWPs are used by one base station (or a macro cell base station and a small cell base station) to transmit data channels, while frequency layers are used by several (usually three or more) base stations to transmit PRS. A UE may indicate the number of frequency layers it can support when it sends the network its positioning capabilities, such as during an LTE positioning protocol (LPP) session. For example, a UE may indicate whether it can support one or four positioning frequency layers.

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS, SSS, SSB, SRS, UL-PRS, etc. In addition, the terms "positioning reference signal" and "PRS" may refer to downlink or uplink positioning reference signals, unless otherwise indicated by the context. If needed to further distinguish the type of PRS, a downlink positioning reference signal may be referred to as a "DL-PRS," and an uplink positioning reference signal (e.g., an SRS-for-positioning, PTRS) may be referred to as an "UL-PRS." In addition, for signals that may be transmitted in both the uplink and downlink (e.g., DMRS, PTRS), the signals may be prepended with "UL" or "DL" to distinguish the direction. For example, "UL-DMRS" may be differentiated from "DL-DMRS."

Figure 5:
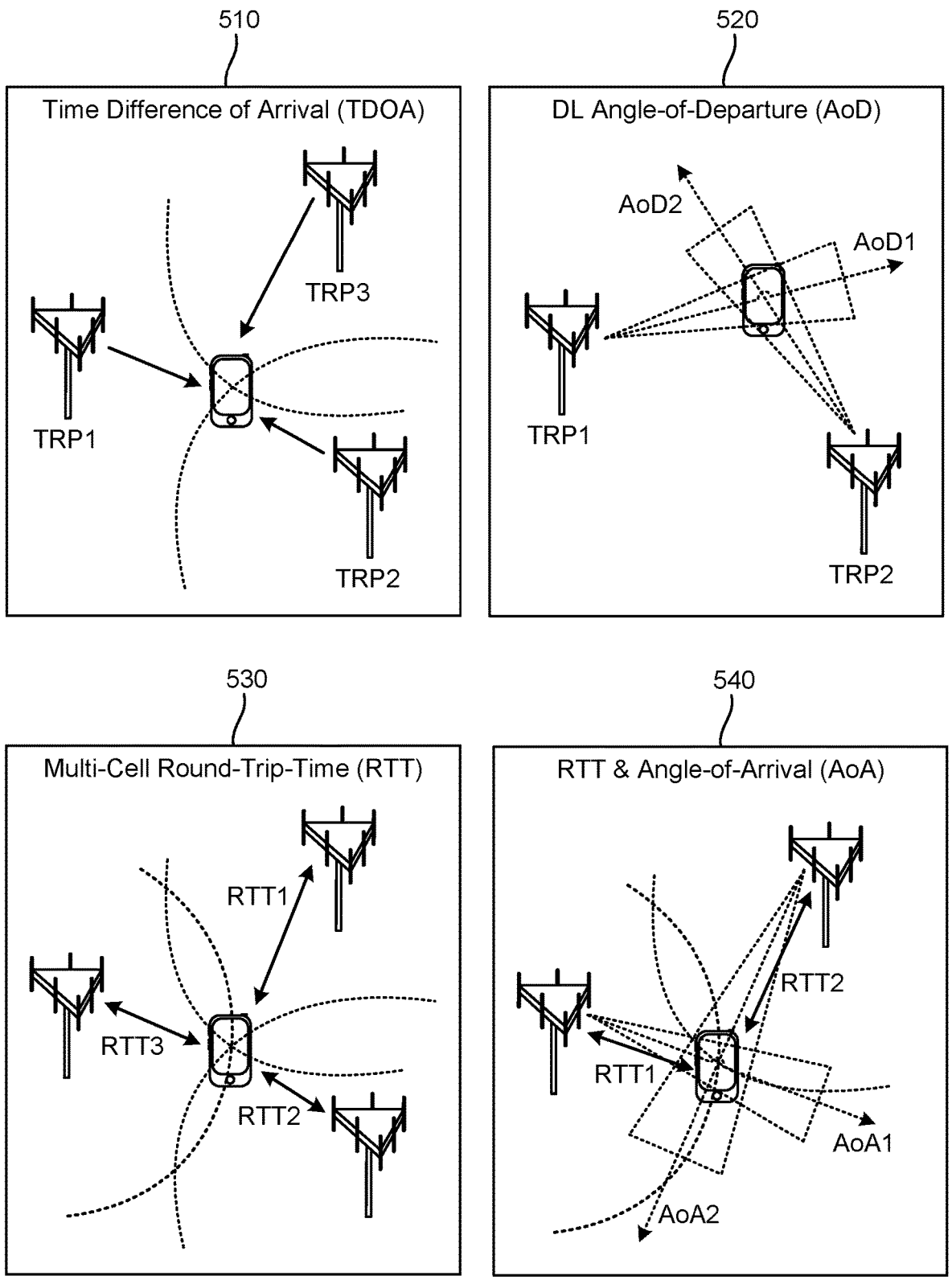
FIG. 5 illustrates examples of various positioning methods supported in New Radio (NR), according to aspects of the disclosure.

NR supports a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. FIG. 5 illustrates examples of various positioning methods, according to aspects of the disclosure. In an OTDOA or DL-TDOA positioning procedure, illustrated by scenario 510, a UE measures the differences between the times of arrival (ToAs) of reference signals (e.g., positioning reference signals (PRS)) received from pairs of base stations, referred to as reference signal time difference (RSTD) or time difference of arrival (TDOA) measurements, and reports them to a positioning entity. More specifically, the UE receives the identifiers (IDs) of a reference base station (e.g., a serving base station) and multiple non-reference base stations in assistance data. The UE then measures the RSTD between the reference base station and each of the non-reference base stations. Based on the known locations of the involved/participating base stations and the RSTD measurements, the positioning entity (e.g., the UE for UE-based positioning or a location server for UE-assisted positioning) can estimate the UE's location.

For DL-AoD positioning, illustrated by scenario 520, the positioning entity uses a beam report from the UE of received signal strength measurements of multiple downlink transmit beams to determine the angle(s) between the UE and the transmitting base station(s). The positioning entity can then estimate the location of the UE based on the determined angle(s) and the known location(s) of the transmitting base station(s).

Uplink-based positioning methods include uplink time difference of arrival (UL-TDOA) and uplink angle-of-arrival (UL-AoA). UL-TDOA is similar to DL-TDOA, but is based on uplink reference signals (e.g., sounding reference signals (SRS)) transmitted by the UE. For UL-AoA positioning, one or more base stations measure the received signal strength of one or more uplink reference signals (e.g., SRS) received from a UE on one or more uplink receive beams. The positioning entity uses the signal strength measurements and the angle(s) of the receive beam(s) to determine the angle(s) between the UE and the base station(s). Based on the determined angle(s) and the known location(s) of the base station(s), the positioning entity can then estimate the location of the UE.

Downlink-and-uplink-based positioning methods include enhanced cell-ID (E-CID) positioning and multi-round-trip-time (RTT) positioning (also referred to as "multi-cell RTT" and "multi-RTT"). In an RTT procedure, a first entity (e.g., a base station or a UE) transmits a first RTT-related signal (e.g., a PRS or SRS) to a second entity (e.g., a UE or base station), which transmits a second RTT-related signal (e.g., an SRS or PRS) back to the first entity. Each entity measures the time difference between the time of arrival (ToA) of the received RTT-related signal and the transmission time of the transmitted RTT-related signal. This time difference is referred to as a reception-to-transmission (Rx-Tx) time difference. The Rx-Tx time difference measurement may be made, or may be adjusted, to include only a time difference between nearest subframe boundaries for the received and transmitted signals. Both entities may then send their Rx-Tx time difference measurement to a location server (e.g., an LMF 270), which calculates the round trip propagation time (i.e., RTT) between the two entities from the two Rx-Tx time difference measurements (e.g., as the sum of the two Rx-Tx time difference measurements). Alternatively, one entity may send its Rx-Tx time difference measurement to the other entity, which then calculates the RTT. The distance between the two entities can be determined from the RTT and the known signal speed (e.g., the speed of light). For multi-RTT positioning, illustrated by scenario 530, a first entity (e.g., a UE or base station) performs an RTT positioning procedure with multiple second entities (e.g., multiple base stations or UEs) to enable the location of the first entity to be determined (e.g., using multilateration) based on distances to, and the known locations of, the second entities. RTT and multi-RTT methods can be combined with other positioning techniques, such as UL-AoA and DL-AoD, to improve location accuracy, as illustrated by scenario 540.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base station(s).

To assist positioning operations, a location server (e.g., location server 230, LMF 270, SLP 272) may provide assistance data to the UE. For example, the assistance data may include identifiers of the base stations (or the cells/TRPs of the base stations) from which to measure reference signals, the reference signal configuration parameters (e.g., the number of consecutive positioning subframes, periodicity of positioning subframes, muting sequence, frequency hopping sequence, reference signal identifier, reference signal bandwidth, etc.), and/or other parameters applicable to the particular positioning method. Alternatively, the assistance data may originate directly from the base stations themselves (e.g., in periodically broadcasted overhead messages, etc.). In some cases, the UE may be able to detect neighbor network nodes itself without the use of assistance data.

In the case of an OTDOA or DL-TDOA positioning procedure, the assistance data may further include an expected RSTD value and an associated uncertainty, or search window, around the expected RSTD. In some cases, the value range of the expected RSTD may be +/−500 microseconds ($\mu$s). In some cases, when any of the resources used for the positioning measurement are in FR1, the value range for the uncertainty of the expected RSTD may be +/−32 $\mu$s. In other cases, when all of the resources used for the positioning measurement(s) are in FR2, the value range for the uncertainty of the expected RSTD may be +/−8 $\mu$s.

NR is also capable of supporting various sidelink ranging and positioning techniques. Sidelink-based ranging enables the determination of the relative distance(s) between UEs and optionally their absolute position(s), when the absolute position of at least one involved UE is known. This technique is valuable in situations where global navigation satellite system (GNSS) positioning is degraded or unavailable (e.g., tunnels, urban canyons, etc.) and can also enhance range and positioning accuracy when GNSS is available.

Sidelink-based ranging can be accomplished via the broadcast of positioning reference signals (PRS) from participating UEs (e.g., any UE capable of sidelink, V2X, V2V, etc. communication) and network entities (e.g., roadside units (RSUs), gNBs, APs, etc.), followed by participants exchanging measurements based on the PRS transmission and reception. Based on these measurements, a participant (a UE or a network entity) can determine its range to the other participants. If at least one participant has accurate knowledge of its location, the result of the ranging exercise is a determination of location for the other participant(s). If none of the participants have knowledge of their location, the result is simply the determination of the inter-participant ranges.

For a UE to determine its location from a sidelink positioning procedure (also referred to as a sidelink ranging procedure, sidelink ranging session, sidelink ranging and positioning procedure, and the like), at least one participant in the procedure needs to have accurate knowledge of its location to serve as an "anchor" for the location calculation (i.e., an "anchor" is a device with a known location that can be used to determine the location of a device with an unknown location). Similarly, for a network entity managing sidelink positioning procedures (e.g., LMF, RSU, gNB), a prerequisite for determining the participants in a sidelink positioning procedure is knowing which, if any, UEs can serve as anchors.

Figure 6:
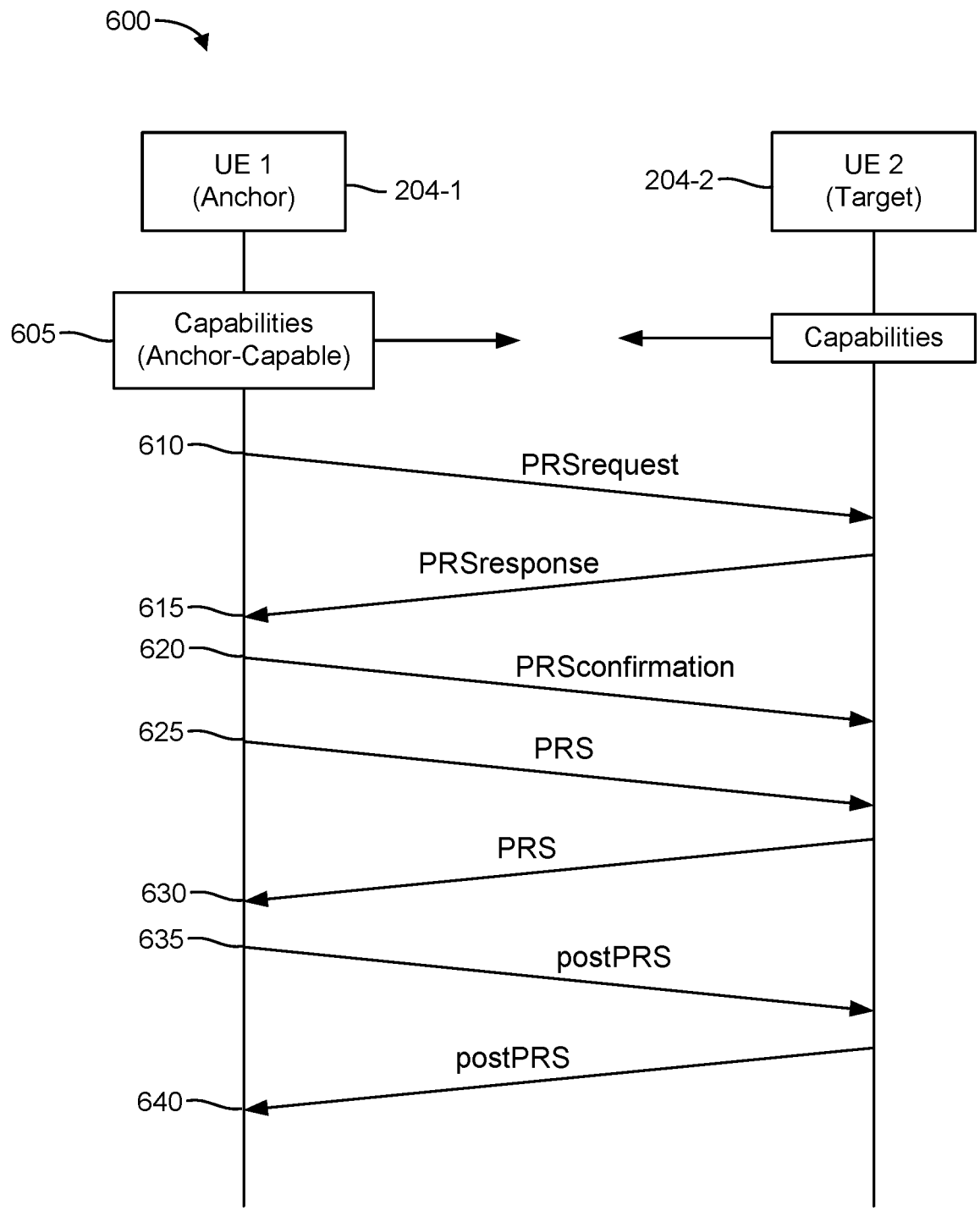
FIG. 6 is a diagram illustrating an example sidelink ranging and positioning procedure, according to aspects of the disclosure.

FIG. 6 illustrates an example sidelink ranging and positioning procedure 600, according to aspects of the disclosure. Sidelink ranging is based on calculating an inter-UE round-trip-time (RTT) measurement, as determined from the transmit and receive times of PRS (a wideband reference signal defined in LTE and NR for positioning). Each UE reports an RTT measurement to all other participating UEs, along with its location (if known). For UEs having zero or inaccurate knowledge of their location, the RTT procedure yields an inter-UE range between the involved UEs. For UEs having accurate knowledge of their location, the range yields an absolute location. UE participation, PRS transmission, and subsequent RTT calculation is coordinated by an initial three-way messaging handshake (a PRS request, a PRS response, and a PRS confirmation), and a message exchange after PRS transmission (post PRS messages) to share measurements after receiving a peer UE's PRS.

The sidelink ranging and positioning procedure 600 (or session) begins with the broadcast of capability information by the involved peer UEs at stage 605. As shown in FIG. 6, one of the peer UEs, UE 204-1 (e.g., any of the sidelink-capable UEs described herein), is capable of being an anchor UE for the sidelink ranging and positioning procedure 600, meaning it has a known location. As such, the anchor UE 204-1 includes an indication in its capability message(s) that it is capable of being an anchor UE for the sidelink ranging and positioning procedure 600. The capability message(s) may also include the location of the anchor UE 204-1, or this may be provided later. The other UE, UE 204-2 (e.g., any other of the sidelink-capable UEs described herein), is a target UE, meaning it has an unknown or inaccurate location and is attempting to be located. Based on the capability information received from the anchor UE 204-1, indicating that the anchor UE 204-1 is an anchor UE, the target UE 204-2 knows that it will be able to determine its location based on performing the sidelink ranging and positioning procedure 600 with the anchor UE 204-1.

After the initial capability exchange, the involved UEs 204 perform a three-way messaging handshake. At stage 610, the anchor UE 204-1 transmits a PRS request (labeled "PRSrequest") to the target UE 204-2. At stage 615, the target UE 204-2 transmits a PRS response (labeled "PRSresponse") to the anchor UE 204-1. At stage 620, the anchor UE 204-1 transmits a PRS confirmation to the target UE 204-2. At this point, the three-way messaging handshake is complete.

At stages 625 and 630, the involved peer UEs 204 transmit PRS to each other. The resources on which the PRS are transmitted may be configured/allocated by the network (e.g., one of the UE's 204 serving base station) or negotiated by the UEs 204 during the three-way messaging handshake. The anchor UE 204-1 measures the Rx-Tx time difference between the transmission time of PRS at stage 625 and the reception time of PRS at stage 630. The target UE 204-2 measures the Rx-Tx time difference between the reception time of PRS at stage 625 and the transmission time of PRS at stage 630.

At stages 635 and 640, the peer UEs 204 exchange their respective Rx-Tx time difference measurements in post PRS messages (labeled "postPRS"). If the anchor UE 204-1 has not yet provided its location to the target UE 204-2, it does so at this point. Each UE 204 is then able to determine the RTT between each UE 204 based on the Rx-Tx and Rx-Tx time difference measurements (specifically, the difference between the Rx-Tx and Rx-Tx time difference measurements). Based on the RTT measurement and the speed of light, each UE 204 can then estimate the distance (or range) between the two UEs 204 (specifically, the time of flight (ToF), i.e., half the RTT measurement, multiplied by the speed of light). Since the target UE 204-2 also has the absolute location (e.g., geographic coordinates) of the anchor UE 204-1, the target UE 204-2 can use that location and the distance to the anchor UE 204-1 to determine its own absolute location.

Note that while FIG. 6 illustrates two UEs 204, a UE may perform, or attempt to perform, the sidelink ranging and positioning procedure 600 with multiple UEs.

5G NR communication devices (e.g., UEs, gNBs, etc.) may use mmW frequency bands (e.g., n260 and n261) to transmit and receive data. In the United States, the FCC limits the maximum power density exposure of electromagnetic waves on human tissues. Specifically, the FCC limits electromagnetic power exposure on human skin to 1 milliwatt (mW) per square centimeter ($cm^2$) averaged over a surface of 4 $cm^2$. One metric used to indicate maximum power density exposure requirements is maximum permissible exposure (MPE), which is the maximum exposure of electromagnetic waves that can incur to a human body.

The International Commission on Non-Ionizing Radiation Protection (ICNIRP) has also proposed MPE requirements for mmW communications. The following table shows the ICNIRP and FCC MPE requirements for mmW frequencies (f).

TABLE 1

| ICNIRP (f > 10 GHz) | FCC (f > 6 GHz) |
| --- | --- |
| 20 mW/$cm^2$ | 1 mW/$cm^2$ |

For customer-premises equipment (CPE), if the mmW device does not know the location of a human near the device, the device must assume that there is a human within 20 cm and therefore, the maximum effective isotropic radiated power (EIRP) level at which it can transmit is 37 decibel milliwatts (dBm) at a 100% uplink duty cycle.

Figure 7:
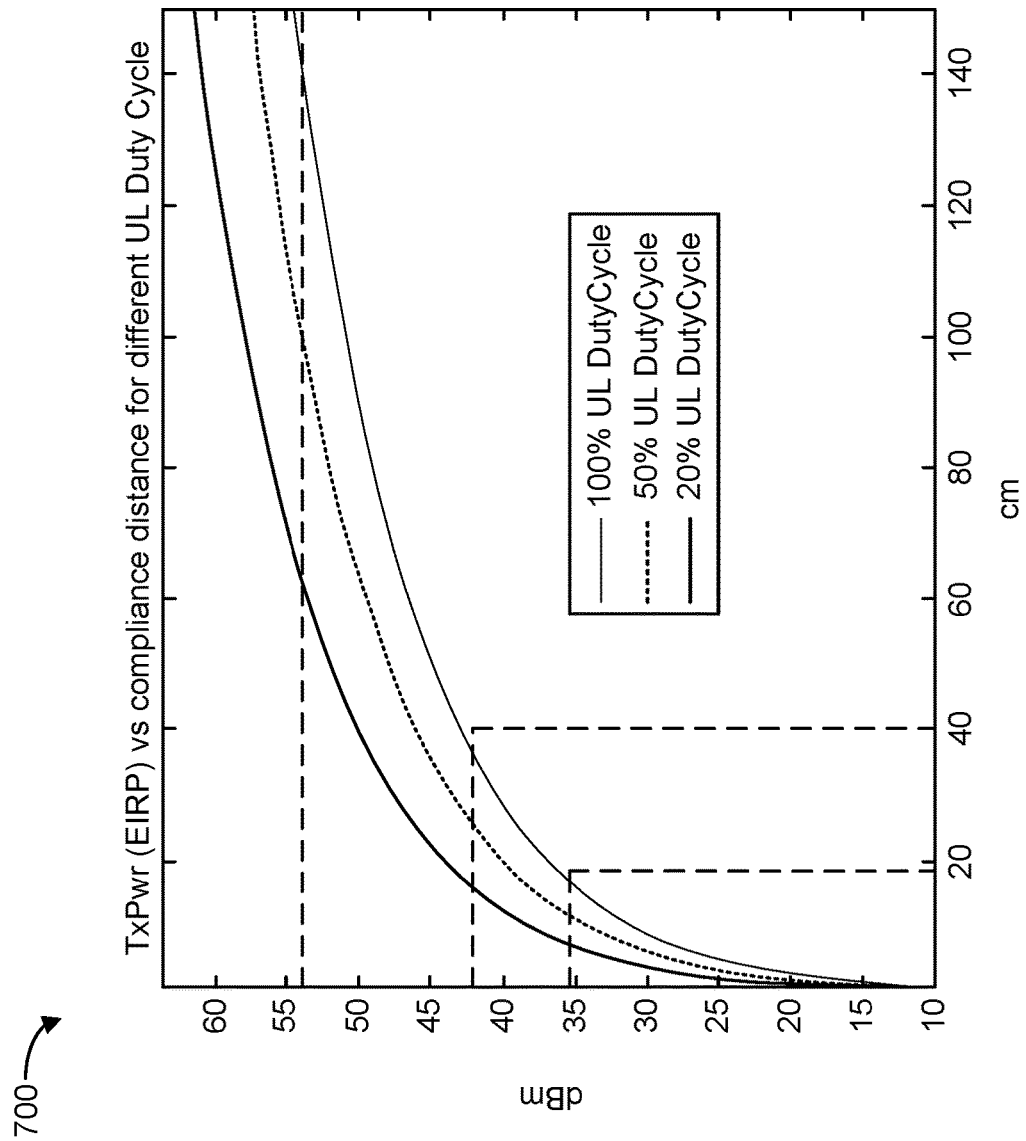
FIG. 7 is a graph illustrating the impact of maximum permissible exposure (MPE) requirements on the maximum allowed effective isotropic radiated power (EIRP).

FIG. 7 is a graph 700 illustrating the impact of the FCC MPE requirement on the maximum allowed EIRP. In FIG. 7, each curve represents the maximum possible EIRP that can be radiated by a mmW device and still comply with the 1 mW/$cm^2$ FCC MPE requirement as a function of the distance between the nearest human and the radiating antenna(s) of the device.

If a mmW device knows that there is no human near the device (e.g., within 150 cm of the device), the device could transmit at maximum power (e.g., 55 dBm) for a 100% uplink duty cycle. Otherwise, based on the distance to the human (e.g., greater than 20 cm), the device could increase the transmit power above 37 dBm accordingly. For example, as shown in FIG. 7, if a human is 40 cm from the device, the device can transmit at 43 dBm.

As such, a mechanism to enable a mmW device to detect the presence and location of a human could permit the mmW device to transmit at a higher power when no humans are nearby, resulting in a higher average transmit power for the device. A higher average transmit power can increase the cell coverage (because the base station and UE can use a higher transmit power, and therefore communicate over farther distances) and/or the uplink throughput of the mmW device.

Accordingly, the present disclosure provides techniques for using positioning and coordination between mmW devices (e.g., UEs, wearables, CPEs, etc.) to assist the devices in detecting any human presence and location to optimize transmit power while satisfying FCC requirements.

Figure 8:
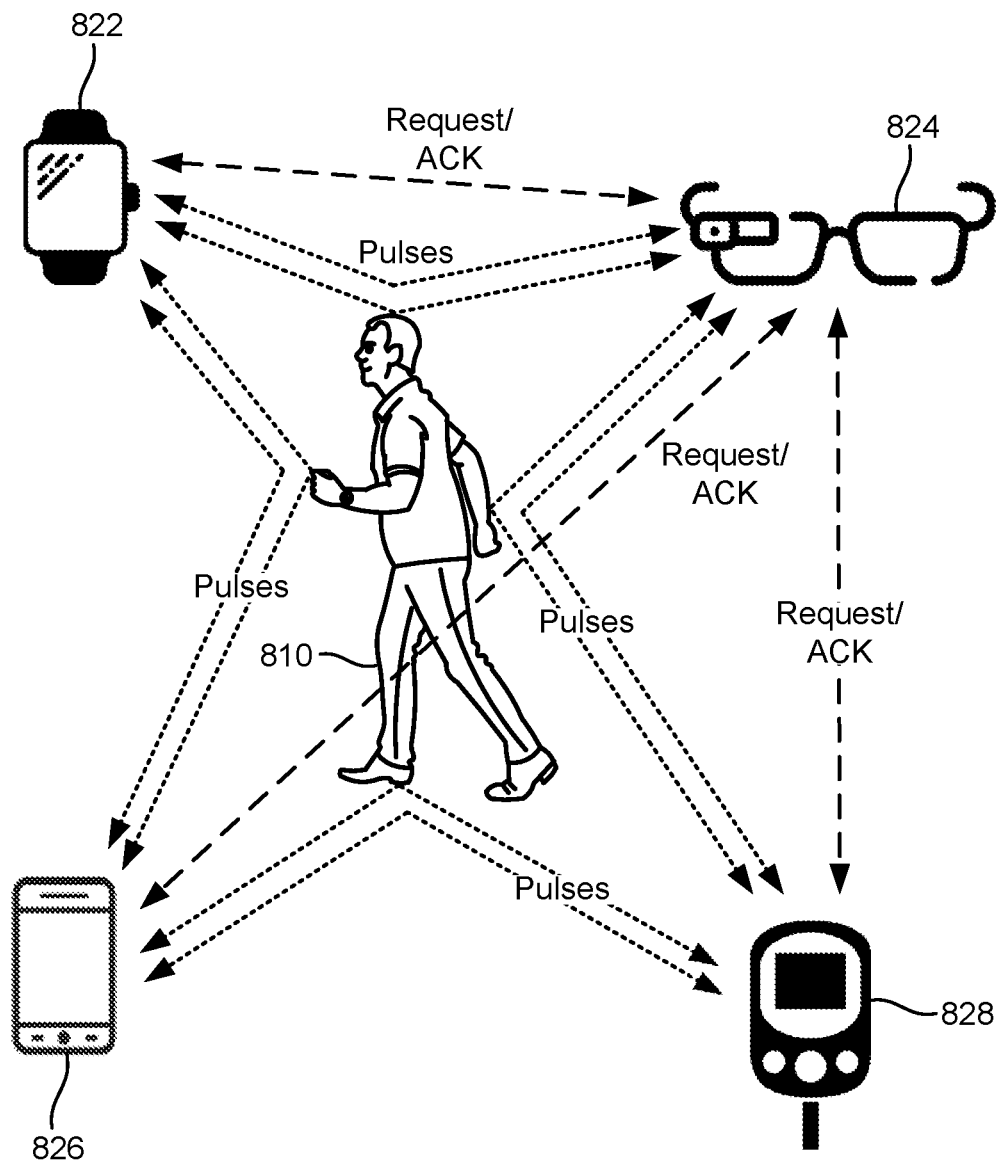
FIG. 8 is a diagram of an example scenario in which four devices coordinate with each other to detect a nearby human, according to aspects of the disclosure.

FIG. 8 is a diagram 800 of an example scenario in which four devices coordinate with each other to detect a nearby human, according to aspects of the disclosure. In the example of FIG. 8, four mmW devices, a "smart" watch 822, a pair of "smart" glasses 824, a "smart" phone 826, and a "smart" health monitoring device 828 are within the same environment as a human 810 (i.e., within range of wireless communication signals). All of these devices may be considered UEs, and the smart watch and smart glasses may be considered wearables. Note that while FIG. 8 illustrates specific examples of mmW devices, the disclosure is not limited to these examples. In addition, while FIG. 8 illustrates four mmW devices, there may be more or fewer devices in the environment of the human 810.

A first technique described herein relates to a coordination method among mmW devices (e.g., mmW devices 822, 824, 826, 828) to detect and optionally locate a human 710. An initiator mmW device (e.g., smart glasses 824 in the example of FIG. 8) attempting to use a higher transmit power can transmit a request for coordination to other nearby devices (e.g., mmW devices 822, 826, 828 in the example of FIG. 8). This request should include an identifier (ID) so that responder devices, whether choosing to participate or not, can respond to this specific request as appropriate.

The desired transmit power may be a transmit power higher than a threshold X for a number of slots/transmissions Y. These values may be determined by the initiator device and indicated in the request. Alternatively, the values X and Y may be configured to the initiator device or all involved/participating devices via RRC signaling or MAC control element (MAC-CE) signaling from a serving base station.

A coordination request may be transmitted on resources reserved for such requests, similar to a wake-up signal (WUS) (which is transmitted on specific resources reserved for WUS). For example, there may be periodic occasions of time and frequency resources reserved for coordination requests. In addition, a request should be transmitted with low power to announce to nearby devices the need of the initiator device to coordinate.

Once a mmW device sends a group coordination request, nearby devices (preferably at least three) that overhear the coordination request and are able to participate in the coordination method are expected to respond with an acknowledgment (ACK). In the example of FIG. 8, each of the smart watch 822, the smart phone 826, and the smart health monitoring device 828 respond with an acknowledgment. The acknowledgment should include the ID of the coordination request. A responding device may be expected to transmit a response/acknowledgment some time period T (e.g., some number of symbols, slot, frames, milliseconds, seconds, etc.) after the occasion in which the request was transmitted and received. Then, once the initiator device receives three (or more) positive responses, it presumes it can continue the coordination method. The responding devices are expected to share their locations with each other in their responses. For example, the responding devices may perform one or more of the positioning procedures described above with reference to FIG. 5, or some other non-NR positioning procedure (e.g., GPS).

After the acknowledgments have been transmitted, each participating device (e.g., mmW devices 822, 824, 826, 828 in FIG. 8) transmits two consecutive pulses towards other nearby devices, similar to the PRS exchanges illustrated in FIG. 6 (except that the pulses may not be PRS). The pulses may be PRS or other type of positioning reference signal, or some other wireless signal having a large bandwidth and short duration, similar to PRS. The measurements of the transmitted/received pulses can be exchanged as at stages 635 and 640 of FIG. 6 to determine the RTTs and/or ToFs between the transmitter and receiver devices. The ToFs can be processed to detect any humans (e.g., human 810) given that humans are generally nonstationary as compared to other objects in the environment (e.g., even a stationary human will generally move at least slightly).

More specifically, since humans are generally non-stationary, the ToF measurements of the two consecutive pulses from a transmitter device will be the same only when static objects are in the environment. Thus, it can easily be determined when there are no humans in the environment. However, when a human 810 is present, the reflected pulses will follow slightly different paths due to motion/micro-motion of the human 810. As such, if the transmitting and receiving devices are stationary but the ToF measurements of the two consecutive pulses are different, then it means there is a human 810 in the environment.

The measurements of the pulses can also be used to locate nearby humans when combined with the locations of the participating devices. For example, when there are at least three participating devices with known locations, the known locations of the participating devices and the ToF measurements between them can be used to triangulate the location of the human.

In various aspects, the computation load can be assigned to one of the devices and then human detection/localization information can be shared with the other devices. For example, the smart phone 826 may have the greatest processing resources of the participating devices and may therefore perform the human detection and localization operations and share the results with at least the smart glasses 824 (as the initiator device). Based on the detected presence and optionally location of the human 810, the smart glasses 824, or all mmW devices 822 to 828, can adjust their transmit power such that it meets the applicable FCC requirements.

In an aspect, motion sensors and/or magnetic compass information can be added to the measurement reports so that the position and orientation values and their changes can be tracked. In addition, for better human detection, other proximity sensors (e.g., touch) can be used for human detection. For example, the human 810 may be interacting with the touchscreen of the smart phone 826, which may be reported by the smart phone 826 to at least the smart glasses 824 as the initiator device.

If an initiator device is unable to coordinate with other devices, or if it (or another device assigned to detect the presence and optionally location of the human 810) cannot handle the processing, the device can send a request for base station assistance. In this base station-assisted method, each device transmits two consecutive pulses to nearby devices, but then, each device transmits the measurements (e.g., Rx-Tx time differences) of the received signals to the base station. The base station determines the locations of the participating devices and processes those locations along with the measurements of the signals transmitted/measured by the devices to detect the presence and optionally estimate the location of the human and share it with the participating devices. Based on that information, the devices can adjust their transmit power such that it meets FCC requirements.

In various aspects of the base station-assisted method, the base station may assign a central device (or primary device), which should be a device with powerful and fast processing resources (e.g., smart phone 826) in order to assist "smaller" IoT devices (e.g., smart watch 822, smart glasses 824, smart health monitoring device 828). In this case, the central device will collect the information (e.g., Rx-Tx time difference measurements of the pulses) and send it to the base station. The base station can then send the result of the human detection and location determination to the central device, which will forward the determination of the presence and location of the human to the other devices.

In the base station-assisted method, the base station may define and assign uplink resources (e.g., physical uplink control channel (PUCCH) resources) for the central device to communicate with the base station.

Once a human is detected (e.g., by the initiator device or other device performing the detection, or the central device or the base station in the case of the base station-assisted method), the detecting device (e.g., smart glasses 824) can send a group common sidelink control information (SCI) message to the other participating devices, or the base station can send a group common downlink control information (DCI) message to the participating devices, or to the central device (e.g., smart phone 826), which can forward the message to the other participating devices via a group common SCI message.

For sidelink communication, a physical sidelink control channel (PSCCH) and a physical sidelink shared channel (PSSCH) may be configured (generally in the same slot otherwise used for uplink transmission). Similar to the physical downlink control channel (PDCCH), the PSCCH carries control information about sidelink resource allocation and descriptions about sidelink data transmitted to the UE. Likewise, similar to the physical downlink shared channel (PDSCH), the PSSCH carries user date for the UE.

The PSCCH carries sidelink control information (SCI). First stage control (referred to as "SCI-1") is transmitted on the PSCCH and contains information for resource allocation and decoding second stage control (referred to as "SCI-2"). The second stage control is transmitted on the PSSCH and contains information for decoding the data that will be transmitted on the shared channel (SCH) of the sidelink. The first stage control information is decodable by all UEs, whereas the second stage control information may include formats that are only decodable by certain UEs. This ensures that new features can be introduced in the second stage control while maintaining resource reservation backward compatibility in the first stage control.

Figure 9:
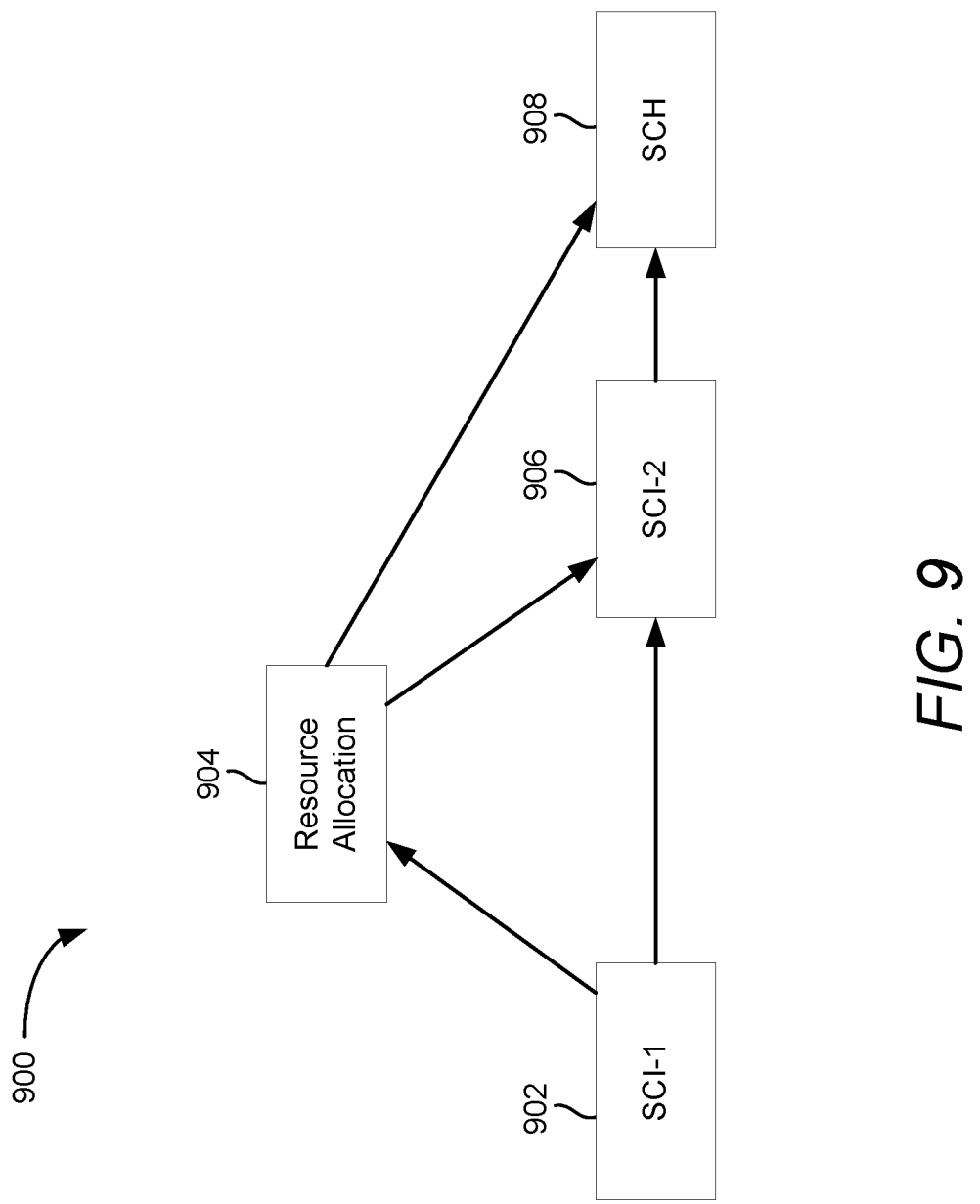
FIG. 9 is a diagram showing how a shared channel (SCH) is established on a sidelink between two or more UEs, according to aspects of the disclosure.

Both the first and second stage control use the PDCCH polar coding chain, illustrated in FIG. 9. FIG. 9 is a diagram 900 showing how the SCH is established on a sidelink between two or more UEs, according to aspects of the disclosure. Specifically, information in the SCI-1 902 is used for resource allocation 904 (by the network or the involved UEs) for the SCI-2 906 and SCH 908. In addition, information in the SCI-1 902 is used to determine/decode the contents of the SCI-2 906 transmitted on the allocated resources. Thus, a receiver UE needs both the resource allocation 904 and the SCI-1 902 to decode the SCI-2 906. Information in the SCI-2 906 is then used to determine/decode the SCH 908.

In various aspects, the base station, or the detecting device (e.g., smart glasses 824), can send the group common DCI or SCI message to the participating devices based on their distance/position relative to the detected human (e.g., human 810). Specifically, since the base station or detecting device knows the locations of the participating devices, and now it knows the location of the human, it can send the information to participating devices that are close to that human (e.g., smart watch 822, smart phone 826, smart health monitoring device 828). Where a central device is involved, the central device (e.g., smart phone 826) can send this information to participating devices that are far away from the base station (e.g., out of coverage of the base station) and close to the human, or do not have an active link to the base station.

A mmW device may determine whether or not to participate in a coordination procedure to detect the presence of a human. In various aspects, mmW devices can share various information related to their capability to participate in such a procedure, such as duplexity (i.e., ability to send and receive simultaneously), battery status (which can lower the ability of the devices to cooperate), ability to participate in coordination within a configured duration, ability to operate as a central device, ability to communicate via RRC/MAC-CE, and/or the like. This information can be signaled periodically, such as every time period K (e.g., some number of symbols, slots, frames, milliseconds, seconds, etc.). The value K may be preconfigured or may be signaled in a request from a central or detecting device or a bases station. Alternatively, the capability information may be exchanged in the capability exchange at stage 605 of FIG. 6.

In various aspects, user assistance information can be used to determine whether or not to participate and/or which role to play. UE assistance information is RRC information transmitted to the network to better optimize network performance. An RRC UE assistance information message may be transmitted in response to reception of an RRC reconfiguration message. The assistance information may include the above-noted capabilities related to a device's ability to participate in a human detection procedure, and may be used by the network (e.g., a location server or serving base station) to determine which devices can/should participate in a human detection procedure and/or which device can/should be a central device for a base station-assisted detection procedure.

In some cases, a device may no longer be able to participate in a human detection procedure. In such cases, the device may terminate its participation before the end of the procedure (referred to as early termination or preemption of the coordination/human detection procedure). For example, a participating device may determine that it is no longer able to participate due to the expectation or scheduling of new upcoming traffic, such as ultra-reliable low-latency communication (URLLC) traffic or some other high-reliability traffic, due to a low battery level, and/or the like. If this happens, the device is expected to send a termination signal within some time period L (e.g., some number of symbols, slots, frames, milliseconds, seconds, etc.) after the acknowledgment it previously sent.

The above termination signal can be transmitted in SCI (e.g., first or second stage SCI, where second stage would avoid any changes to first stage). Alternatively, a polar or sequence-based signal can be used in different occasions triggered after the acknowledgment. These occasions may last for M occasions within a maximum length of L from the acknowledgment.

Figure 10:
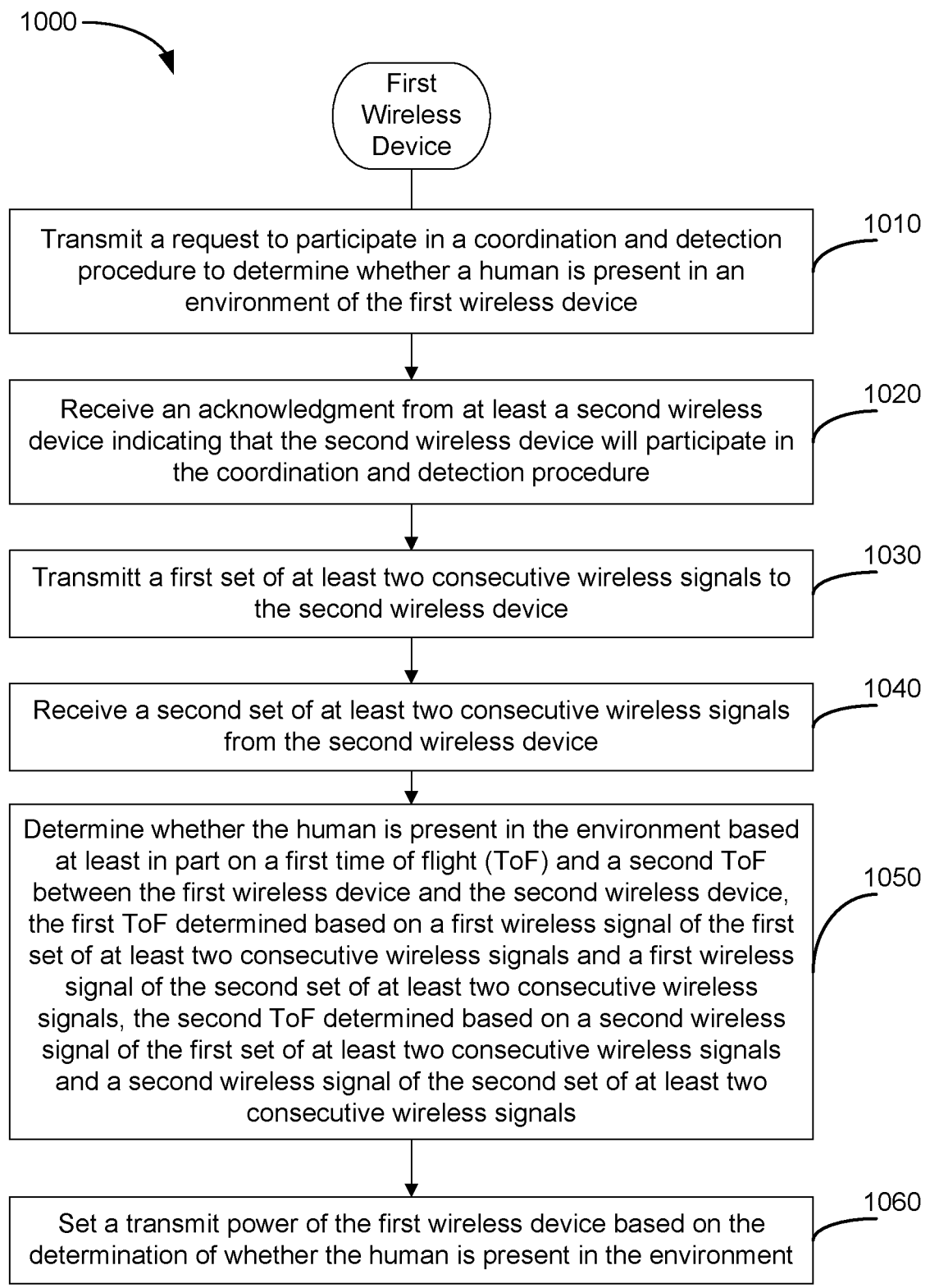
FIGS. 10 and 11 illustrate example methods of wireless communication, according to aspects of the disclosure.

FIG. 10 illustrates an example method 1000 of wireless communication, according to aspects of the disclosure. In an aspect, method 1000 may be performed by a first wireless device (e.g., any of the mmW devices described herein, such as UEs, CPEs, wearables, small cell base stations, etc.).

At 1010, the first wireless device transmits a request to participate in a coordination and detection procedure to determine whether a human (e.g., human 810) is present in an environment of the first wireless device. In an aspect, operation 1010 may be performed by the one or more WWAN transceivers 310, the one or more processors 332, memory 340, and/or sensing component 342, any or all of which may be considered means for performing this operation.

At 1020, the first wireless device receives an acknowledgment from at least a second wireless device (e.g., any other mmW device described herein) indicating that the second wireless device will participate in the coordination and detection procedure. In an aspect, operation 1020 may be performed by the one or more WWAN transceivers 310, the one or more processors 332, memory 340, and/or sensing component 342, any or all of which may be considered means for performing this operation.

At 1030, the first wireless device transmits a first set of at least two consecutive wireless signals (pulses) to the second wireless device, as illustrated in FIG. 8. In an aspect, operation 1030 may be performed by the one or more WWAN transceivers 310, the one or more processors 332, memory 340, and/or sensing component 342, any or all of which may be considered means for performing this operation.

At 1040, the first wireless device receives a second set of at least two consecutive wireless signals (pulses) from the second wireless device, as illustrated in FIG. 8. In an aspect, operation 1040 may be performed by the one or more WWAN transceivers 310, the one or more processors 332, memory 340, and/or sensing component 342, any or all of which may be considered means for performing this operation.

At 1050, the first wireless device determines whether the human is present in the environment based at least in part on a first ToF and a second ToF between the first wireless device and the second wireless device, the first ToF determined based on a first wireless signal of the first set of at least two consecutive wireless signals and a first wireless signal of the second set of at least two consecutive wireless signals, the second ToF determined based on a second wireless signal of the first set of at least two consecutive wireless signals and a second wireless signal of the second set of at least two consecutive wireless signals. In an aspect, operation 1050 may be performed by the one or more WWAN transceivers 310, the one or more processors 332, memory 340, and/or sensing component 342, any or all of which may be considered means for performing this operation.

At 1060, the first wireless device sets a transmit power of the first wireless device based on the determination of whether the human is present in the environment. In an aspect, operation 1060 may be performed by the one or more WWAN transceivers 310, the one or more processors 332, memory 340, and/or sensing component 342, any or all of which may be considered means for performing this operation.

Figure 11:
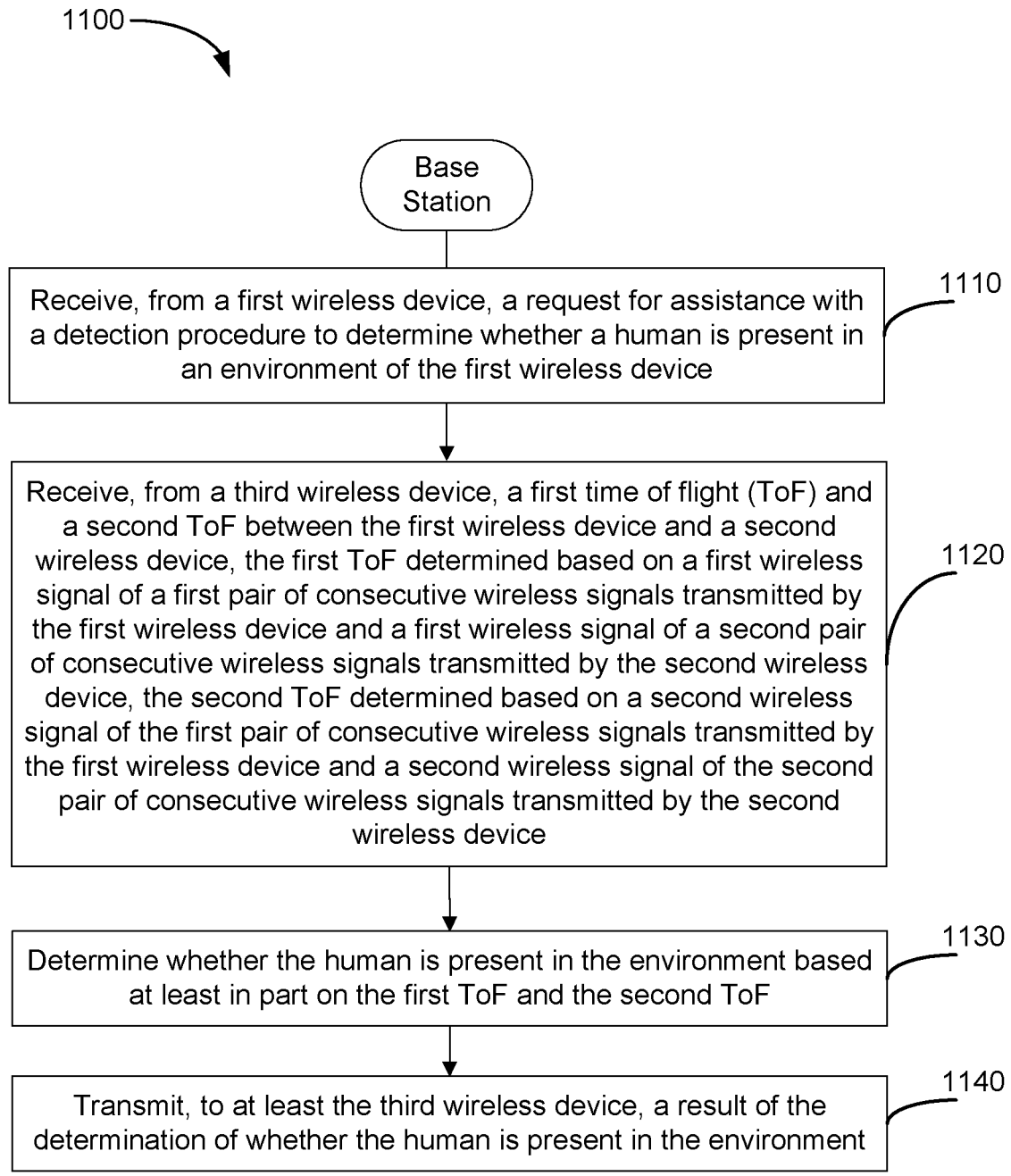

FIG. 11 illustrates an example method 1100 of wireless communication, according to aspects of the disclosure. In an aspect, method 1100 may be performed by a base station (e.g., any of the base stations described herein).

At 1110, the base station receives, from a first wireless device (e.g., any of the mmW devices described herein), a request for assistance with a detection procedure to determine whether a human (e.g., human 810) is present in an environment of the first wireless device. In an aspect, operation 1110 may be performed by the one or more WWAN transceivers 350, the one or more processors 384, memory 386, and/or sensing component 388, any or all of which may be considered means for performing this operation.

At 1120, the base station receives, from a third wireless device (e.g., any of the mmW devices described herein), a first ToF and a second ToF between the first wireless device and a second wireless device (e.g., any other of the mmW devices described herein), the first ToF determined based on a first wireless signal of a first pair of consecutive wireless signals transmitted by the first wireless device and a first wireless signal of a second pair of consecutive wireless signals transmitted by the second wireless device, the second ToF determined based on a second wireless signal of the first pair of consecutive wireless signals transmitted by the first wireless device and a second wireless signal of the second pair of consecutive wireless signals transmitted by the second wireless device (e.g., as discussed above with reference to FIG. 8). In an aspect, operation 1120 may be performed by the one or more WWAN transceivers 350, the one or more processors 384, memory 386, and/or sensing component 388, any or all of which may be considered means for performing this operation.

At 1130, the base station determines whether the human is present in the environment based at least in part on the first ToF and the second ToF. In an aspect, operation 1130 may be performed by the one or more WWAN transceivers 350, the one or more processors 384, memory 386, and/or sensing component 388, any or all of which may be considered means for performing this operation.

At 1140, the base station transmits, to at least the third wireless device, a result of the determination of whether the human is present in the environment. In an aspect, operation 1140 may be performed by the one or more WWAN transceivers 350, the one or more processors 384, memory 386, and/or sensing component 388, any or all of which may be considered means for performing this operation.

As will be appreciated, a technical advantage of the methods 1000 and 1100 is enabling a wireless device to transmit at a higher power when no humans are nearby, resulting in a higher average transmit power for the device.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of wireless communication performed by a first wireless device, comprising: transmitting a request to participate in a coordination and detection procedure to determine whether a human is present in an environment of the first wireless device; receiving an acknowledgment from at least a second wireless device indicating that the second wireless device will participate in the coordination and detection procedure; transmitting a first set of at least two consecutive wireless signals to the second wireless device; receiving a second set of at least two consecutive wireless signals from the second wireless device; determining whether the human is present in the environment based at least in part on a first time of flight (ToF) and a second ToF between the first wireless device and the second wireless device, the first ToF determined based on a first wireless signal of the first set of at least two consecutive wireless signals and a first wireless signal of the second set of at least two consecutive wireless signals, the second ToF determined based on a second wireless signal of the first set of at least two consecutive wireless signals and a second wireless signal of the second set of at least two consecutive wireless signals; and setting a transmit power of the first wireless device based on the determination of whether the human is present in the environment.

Clause 2. The method of clause 1, wherein: the request includes an identifier, and the acknowledgment includes the identifier.

Clause 3. The method of any of clauses 1 to 2, wherein: the request is received within a threshold period of time after transmission of the request, and the first set of at least two consecutive wireless signals are transmitted and the second set of at least two consecutive wireless signals are received after the threshold period of time expires.

Clause 4. The method of any of clauses 1 to 3, further comprising: receiving, from a base station, a transmit power threshold and a time duration threshold, wherein setting the transmit power comprises increasing the transmit power above the transmit power threshold for a length of time less than or equal to the time duration threshold.

Clause 5. The method of any of clauses 1 to 4, further comprising: receiving a location of the second wireless device, wherein the determination of whether the human is present in the environment is further based at least in part on the location of the second wireless device.

Clause 6. The method of any of clauses 1 to 5, further comprising: receiving a measurement report from the second wireless device, the measurement report including measurements of the first set of at least two consecutive wireless signals, the measurement report further including sensor information of the second wireless device.

Clause 7. The method of clause 6, wherein the sensor information indicates that the human is touching the second wireless device.

Clause 8. The method of any of clauses 1 to 7, wherein the determination of whether the human is present in the environment comprises: transmitting a request for assistance to a base station; transmitting the first ToF and the second ToF to the base station to enable the base station to perform the determination of whether the human is present in the environment; and receiving, from the base station, a result of the determination of whether the human is present in the environment.

Clause 9. The method of clause 8, further comprising: transmitting the result of the determination of whether the human is present in the environment to at least the second wireless device.

Clause 10. The method of clause 9, wherein the result of the determination of whether the human is present in the environment is transmitted to at least the second wireless device based on the second wireless device being within a threshold distance of a location of the human.

Clause 11. The method of any of clauses 8 to 10, further comprising: receiving, from the base station, a location of the human based on a location of the first wireless device being within a threshold distance of the location of the human.

Clause 12. The method of any of clauses 1 to 11, further comprising: transmitting, to the second wireless device, a first capabilities message indicating one or more capabilities of the first wireless device related to participation in the determination of whether the human is present in the environment; and receiving, from the second wireless device, a second capabilities message indicating one or more capabilities of the second wireless device related to participation in the determination of whether the human is present in the environment.

Clause 13. The method of any of clauses 1 to 12, further comprising: receiving a second acknowledgment from a third wireless device indicating that the third wireless device will participate in the coordination and detection procedure; and receiving, from the third wireless device, an indication that the third wireless device is terminating participation in the determination of whether the human is present in the environment, wherein the indication is received from the third wireless device within a threshold period of time from reception of the second acknowledgment.

Clause 14. A method of wireless communication performed by a base station, comprising: receiving, from a first wireless device, a request for assistance with a detection procedure to determine whether a human is present in an environment of the first wireless device; receiving, from a third wireless device, a first time of flight (ToF) and a second ToF between the first wireless device and a second wireless device, the first ToF determined based on a first wireless signal of a first pair of consecutive wireless signals transmitted by the first wireless device and a first wireless signal of a second pair of consecutive wireless signals transmitted by the second wireless device, the second ToF determined based on a second wireless signal of the first pair of consecutive wireless signals transmitted by the first wireless device and a second wireless signal of the second pair of consecutive wireless signals transmitted by the second wireless device; determining whether the human is present in the environment based at least in part on the first ToF and the second ToF; and transmitting, to at least the third wireless device, a result of the determination of whether the human is present in the environment.

Clause 15. The method of clause 14, wherein the first wireless device and the third wireless device are the same wireless device.

Clause 16. The method of any of clauses 14 to 15, further comprising: determining a location of the human; and transmitting the location of the human to at least the third wireless device.

Clause 17. The method of clause 16, wherein: the first wireless device and the third wireless device are different wireless devices, and the location of the human is transmitted to the third wireless device to enable the third wireless device to transmit the location of the human to the first wireless device.

Clause 18. The method of clause 14, wherein: the first wireless device and the third wireless device are different wireless devices, and the method further comprises assigning the third wireless device as a central device to collect the first ToF and the second ToF from the first wireless device.

Clause 19. The method of any of clauses 14 to 18, further comprising: transmitting, to at least the first wireless device, the result of the determination of whether the human is present in the environment.

Clause 20. The method of clause 19, further comprising: transmitting, to at least the first wireless device, a location of the human based on a location of the first wireless device being within a threshold distance of the location of the human.

Clause 21. The method of any of clauses 14 to 20, further comprising: receiving user assistance information from at least the third wireless device, the user assistance information including one or more capabilities of the third wireless device related to participation in the detection procedure to determine whether the human is present in the environment.

Clause 22. The method of any of clauses 14 to 21, further comprising: transmitting, to at least the third wireless device, a transmit power threshold and a time duration threshold, wherein at least the third wireless device is permitted to increase transmit power above the transmit power threshold for a length of time less than or equal to the time duration threshold.

Clause 23. A first wireless device, comprising: a memory; at least one transceiver; and at least one processor communicatively coupled to the memory and the at least one transceiver, the at least one processor configured to: transmit, via the at least one transceiver, a request to participate in a coordination and detection procedure to determine whether a human is present in an environment of the first wireless device; receive, via the at least one transceiver, an acknowledgment from at least a second wireless device indicating that the second wireless device will participate in the coordination and detection procedure; transmit, via the at least one transceiver, a first set of at least two consecutive wireless signals to the second wireless device; receive, via the at least one transceiver, a second set of at least two consecutive wireless signals from the second wireless device; determine whether the human is present in the environment based at least in part on a first time of flight (ToF) and a second ToF between the first wireless device and the second wireless device, the first ToF determined based on a first wireless signal of the first set of at least two consecutive wireless signals and a first wireless signal of the second set of at least two consecutive wireless signals, the second ToF determined based on a second wireless signal of the first set of at least two consecutive wireless signals and a second wireless signal of the second set of at least two consecutive wireless signals; and set a transmit power of the first wireless device based on the determination of whether the human is present in the environment.

Clause 24. The first wireless device of clause 23, wherein: the request includes an identifier, and the acknowledgment includes the identifier.

Clause 25. The first wireless device of any of clauses 23 to 24, wherein: the request is received within a threshold period of time after transmission of the request, and the first set of at least two consecutive wireless signals are transmitted and the second set of at least two consecutive wireless signals are received after the threshold period of time expires.

Clause 26. The first wireless device of any of clauses 23 to 25, wherein the at least one processor is further configured to: receive, via the at least one transceiver, from a base station, a transmit power threshold and a time duration threshold, wherein the at least one processor configured to set the transmit power comprises the at least one processor configured to increase the transmit power above the transmit power threshold for a length of time less than or equal to the time duration threshold.

Clause 27. The first wireless device of any of clauses 23 to 26, wherein the at least one processor is further configured to: receive, via the at least one transceiver, a location of the second wireless device, wherein the determination of whether the human is present in the environment is further based at least in part on the location of the second wireless device.

Clause 28. The first wireless device of any of clauses 23 to 27, wherein the at least one processor is further configured to: receive, via the at least one transceiver, a measurement report from the second wireless device, the measurement report including measurements of the first set of at least two consecutive wireless signals, the measurement report further including sensor information of the second wireless device.

Clause 29. The first wireless device of clause 28, wherein the sensor information indicates that the human is touching the second wireless device.

Clause 30. The first wireless device of any of clauses 23 to 29, wherein the at least one processor configured to determine whether the human is present in the environment comprises the at least one processor configured to: transmit, via the at least one transceiver, a request for assistance to a base station; transmit, via the at least one transceiver, the first ToF and the second ToF to the base station to enable the base station to perform the determination of whether the human is present in the environment; and receive, via the at least one transceiver, from the base station, a result of the determination of whether the human is present in the environment.

Clause 31. The first wireless device of clause 30, wherein the at least one processor is further configured to: transmit, via the at least one transceiver, the result of the determination of whether the human is present in the environment to at least the second wireless device.

Clause 32. The first wireless device of clause 31, wherein the result of the determination of whether the human is present in the environment is transmitted to at least the second wireless device based on the second wireless device being within a threshold distance of a location of the human.

Clause 33. The first wireless device of any of clauses 30 to 32, wherein the at least one processor is further configured to: receive, via the at least one transceiver, from the base station, a location of the human based on a location of the first wireless device being within a threshold distance of the location of the human.

Clause 34. The first wireless device of any of clauses 23 to 33, wherein the at least one processor is further configured to: transmit, via the at least one transceiver, to the second wireless device, a first capabilities message indicating one or more capabilities of the first wireless device related to participation in the determination of whether the human is present in the environment; and receive, via the at least one transceiver, from the second wireless device, a second capabilities message indicating one or more capabilities of the second wireless device related to participation in the determination of whether the human is present in the environment.

Clause 35. The first wireless device of any of clauses 23 to 34, wherein the at least one processor is further configured to: receive, via the at least one transceiver, a second acknowledgment from a third wireless device indicating that the third wireless device will participate in the coordination and detection procedure; and receive, via the at least one transceiver, from the third wireless device, an indication that the third wireless device is terminating participation in the determination of whether the human is present in the environment, wherein the indication is received from the third wireless device within a threshold period of time from reception of the second acknowledgment.

Clause 36. A base station, comprising: a memory; at least one transceiver; and at least one processor communicatively coupled to the memory and the at least one transceiver, the at least one processor configured to: receive, via the at least one transceiver, from a first wireless device, a request for assistance with a detection procedure to determine whether a human is present in an environment of the first wireless device; receive, via the at least one transceiver, from a third wireless device, a first time of flight (ToF) and a second ToF between the first wireless device and a second wireless device, the first ToF determined based on a first wireless signal of a first pair of consecutive wireless signals transmitted by the first wireless device and a first wireless signal of a second pair of consecutive wireless signals transmitted by the second wireless device, the second ToF determined based on a second wireless signal of the first pair of consecutive wireless signals transmitted by the first wireless device and a second wireless signal of the second pair of consecutive wireless signals transmitted by the second wireless device; determine whether the human is present in the environment based at least in part on the first ToF and the second ToF; and transmit, via the at least one transceiver, to at least the third wireless device, a result of the determination of whether the human is present in the environment.

Clause 37. The base station of clause 36, wherein the first wireless device and the third wireless device are the same wireless device.

Clause 38. The base station of any of clauses 36 to 37, wherein the at least one processor is further configured to: determine a location of the human; and transmit, via the at least one transceiver, the location of the human to at least the third wireless device.

Clause 39. The base station of clause 38, wherein: the first wireless device and the third wireless device are different wireless devices, and the location of the human is transmitted to the third wireless device to enable the third wireless device to transmit the location of the human to the first wireless device.

Clause 40. The base station of clause 36, wherein: the first wireless device and the third wireless device are different wireless devices, and the at least one processor further configured to assign the third wireless device as a central device to collect the first ToF and the second ToF from the first wireless device.

Clause 41. The base station of any of clauses 36 to 40, wherein the at least one processor is further configured to: transmit, via the at least one transceiver, to at least the first wireless device, the result of the determination of whether the human is present in the environment.

Clause 42. The base station of clause 41, wherein the at least one processor is further configured to: transmit, via the at least one transceiver, to at least the first wireless device, a location of the human based on a location of the first wireless device being within a threshold distance of the location of the human.

Clause 43. The base station of any of clauses 36 to 42, wherein the at least one processor is further configured to: receive, via the at least one transceiver, user assistance information from at least the third wireless device, the user assistance information including one or more capabilities of the third wireless device related to participation in the detection procedure to determine whether the human is present in the environment.

Clause 44. The base station of any of clauses 36 to 43, wherein the at least one processor is further configured to: transmit, via the at least one transceiver, to at least the third wireless device, a transmit power threshold and a time duration threshold, wherein at least the third wireless device is permitted to increase transmit power above the transmit power threshold for a length of time less than or equal to the time duration threshold.

Clause 45. A first wireless device, comprising: means for transmitting a request to participate in a coordination and detection procedure to determine whether a human is present in an environment of the first wireless device; means for receiving an acknowledgment from at least a second wireless device indicating that the second wireless device will participate in the coordination and detection procedure; means for transmitting a first set of at least two consecutive wireless signals to the second wireless device; means for receiving a second set of at least two consecutive wireless signals from the second wireless device; means for determining whether the human is present in the environment based at least in part on a first time of flight (ToF) and a second ToF between the first wireless device and the second wireless device, the first ToF determined based on a first wireless signal of the first set of at least two consecutive wireless signals and a first wireless signal of the second set of at least two consecutive wireless signals, the second ToF determined based on a second wireless signal of the first set of at least two consecutive wireless signals and a second wireless signal of the second set of at least two consecutive wireless signals; and means for setting a transmit power of the first wireless device based on the determination of whether the human is present in the environment.

Clause 46. The first wireless device of clause 45, wherein: the request includes an identifier, and the acknowledgment includes the identifier.

Clause 47. The first wireless device of any of clauses 45 to 46, wherein: the request is received within a threshold period of time after transmission of the request, and the first set of at least two consecutive wireless signals are transmitted and the second set of at least two consecutive wireless signals are received after the threshold period of time expires.

Clause 48. The first wireless device of any of clauses 45 to 47, further comprising: means for receiving, from a base station, a transmit power threshold and a time duration threshold, wherein the means for setting the transmit power comprises means for increasing the transmit power above the transmit power threshold for a length of time less than or equal to the time duration threshold.

Clause 49. The first wireless device of any of clauses 45 to 48, further comprising: means for receiving a location of the second wireless device, wherein the determination of whether the human is present in the environment is further based at least in part on the location of the second wireless device.

Clause 50. The first wireless device of any of clauses 45 to 49, further comprising: means for receiving a measurement report from the second wireless device, the measurement report including measurements of the first set of at least two consecutive wireless signals, the measurement report further including sensor information of the second wireless device.

Clause 51. The first wireless device of clause 50, wherein the sensor information indicates that the human is touching the second wireless device.

Clause 52. The first wireless device of any of clauses 45 to 51, wherein the means for determining whether the human is present in the environment comprises: means for transmitting a request for assistance to a base station; means for transmitting the first ToF and the second ToF to the base station to enable the base station to perform the determination of whether the human is present in the environment; and means for receiving, from the base station, a result of the determination of whether the human is present in the environment.

Clause 53. The first wireless device of clause 52, further comprising: means for transmitting the result of the determination of whether the human is present in the environment to at least the second wireless device.

Clause 54. The first wireless device of clause 53, wherein the result of the determination of whether the human is present in the environment is transmitted to at least the second wireless device based on the second wireless device being within a threshold distance of a location of the human.

Clause 55. The first wireless device of any of clauses 52 to 54, further comprising: means for receiving, from the base station, a location of the human based on a location of the first wireless device being within a threshold distance of the location of the human.

Clause 56. The first wireless device of any of clauses 45 to 55, further comprising: means for transmitting, to the second wireless device, a first capabilities message indicating one or more capabilities of the first wireless device related to participation in the determination of whether the human is present in the environment; and means for receiving, from the second wireless device, a second capabilities message indicating one or more capabilities of the second wireless device related to participation in the determination of whether the human is present in the environment.

Clause 57. The first wireless device of any of clauses 45 to 56, further comprising: means for receiving a second acknowledgment from a third wireless device indicating that the third wireless device will participate in the coordination and detection procedure; and means for receiving, from the third wireless device, an indication that the third wireless device is terminating participation in the determination of whether the human is present in the environment, wherein the indication is received from the third wireless device within a threshold period of time from reception of the second acknowledgment.

Clause 58. A base station, comprising: means for receiving, from a first wireless device, a request for assistance with a detection procedure to determine whether a human is present in an environment of the first wireless device; means for receiving, from a third wireless device, a first time of flight (ToF) and a second ToF between the first wireless device and a second wireless device, the first ToF determined based on a first wireless signal of a first pair of consecutive wireless signals transmitted by the first wireless device and a first wireless signal of a second pair of consecutive wireless signals transmitted by the second wireless device, the second ToF determined based on a second wireless signal of the first pair of consecutive wireless signals transmitted by the first wireless device and a second wireless signal of the second pair of consecutive wireless signals transmitted by the second wireless device; means for determining whether the human is present in the environment based at least in part on the first ToF and the second ToF; and means for transmitting, to at least the third wireless device, a result of the determination of whether the human is present in the environment.

Clause 59. The base station of clause 58, wherein the first wireless device and the third wireless device are the same wireless device.

Clause 60. The base station of any of clauses 58 to 59, further comprising: means for determining a location of the human; and means for transmitting the location of the human to at least the third wireless device.

Clause 61. The base station of clause 60, wherein: the first wireless device and the third wireless device are different wireless devices, and the location of the human is transmitted to the third wireless device to enable the third wireless device to transmit the location of the human to the first wireless device.

Clause 62. The base station of clause 58, wherein: the first wireless device and the third wireless device are different wireless devices, and the base station further comprises means for assigning the third wireless device as a central device to collect the first ToF and the second ToF from the first wireless device.

Clause 63. The base station of any of clauses 58 to 62, further comprising: means for transmitting, to at least the first wireless device, the result of the determination of whether the human is present in the environment.

Clause 64. The base station of clause 63, further comprising: means for transmitting, to at least the first wireless device, a location of the human based on a location of the first wireless device being within a threshold distance of the location of the human.

Clause 65. The base station of any of clauses 58 to 64, further comprising: means for receiving user assistance information from at least the third wireless device, the user assistance information including one or more capabilities of the third wireless device related to participation in the detection procedure to determine whether the human is present in the environment.

Clause 66. The base station of any of clauses 58 to 65, further comprising: means for transmitting, to at least the third wireless device, a transmit power threshold and a time duration threshold, wherein at least the third wireless device is permitted to increase transmit power above the transmit power threshold for a length of time less than or equal to the time duration threshold.

Clause 67. A non-transitory computer-readable medium storing computer-executable instructions that, when executed by a first wireless device, cause the first wireless device to: transmit a request to participate in a coordination and detection procedure to determine whether a human is present in an environment of the first wireless device; receive an acknowledgment from at least a second wireless device indicating that the second wireless device will participate in the coordination and detection procedure; transmit a first set of at least two consecutive wireless signals to the second wireless device; receive a second set of at least two consecutive wireless signals from the second wireless device; determine whether the human is present in the environment based at least in part on a first time of flight (ToF) and a second ToF between the first wireless device and the second wireless device, the first ToF determined based on a first wireless signal of the first set of at least two consecutive wireless signals and a first wireless signal of the second set of at least two consecutive wireless signals, the second ToF determined based on a second wireless signal of the first set of at least two consecutive wireless signals and a second wireless signal of the second set of at least two consecutive wireless signals; and set a transmit power of the first wireless device based on the determination of whether the human is present in the environment.

Clause 68. The non-transitory computer-readable medium of clause 67, wherein: the request includes an identifier, and the acknowledgment includes the identifier.

Clause 69. The non-transitory computer-readable medium of any of clauses 67 to 68, wherein: the request is received within a threshold period of time after transmission of the request, and the first set of at least two consecutive wireless signals are transmitted and the second set of at least two consecutive wireless signals are received after the threshold period of time expires.

Clause 70. The non-transitory computer-readable medium of any of clauses 67 to 69, further comprising computer-executable instructions that, when executed by the first wireless device, cause the first wireless device to: receive, from a base station, a transmit power threshold and a time duration threshold, wherein the computer-executable instructions that, when executed by the first wireless device, cause the first wireless device to set the transmit power comprise computer-executable instructions that, when executed by the first wireless device, cause the first wireless device to increase the transmit power above the transmit power threshold for a length of time less than or equal to the time duration threshold.

Clause 71. The non-transitory computer-readable medium of any of clauses 67 to 70, further comprising computer-executable instructions that, when executed by the first wireless device, cause the first wireless device to: receive a location of the second wireless device, wherein the determination of whether the human is present in the environment is further based at least in part on the location of the second wireless device.

Clause 72. The non-transitory computer-readable medium of any of clauses 67 to 71, further comprising computer-executable instructions that, when executed by the first wireless device, cause the first wireless device to: receive a measurement report from the second wireless device, the measurement report including measurements of the first set of at least two consecutive wireless signals, the measurement report further including sensor information of the second wireless device.

Clause 73. The non-transitory computer-readable medium of clause 72, wherein the sensor information indicates that the human is touching the second wireless device.

Clause 74. The non-transitory computer-readable medium of any of clauses 67 to 73, wherein the computer-executable instructions that, when executed by the first wireless device, cause the first wireless device to determine whether the human is present in the environment comprise computer-executable instructions that, when executed by the first wireless device, cause the first wireless device to: transmit a request for assistance to a base station; transmit the first ToF and the second ToF to the base station to enable the base station to perform the determination of whether the human is present in the environment; and receive, from the base station, a result of the determination of whether the human is present in the environment.

Clause 75. The non-transitory computer-readable medium of clause 74, further comprising computer-executable instructions that, when executed by the first wireless device, cause the first wireless device to: transmit the result of the determination of whether the human is present in the environment to at least the second wireless device.

Clause 76. The non-transitory computer-readable medium of clause 75, wherein the result of the determination of whether the human is present in the environment is transmitted to at least the second wireless device based on the second wireless device being within a threshold distance of a location of the human.

Clause 77. The non-transitory computer-readable medium of any of clauses 74 to 76, further comprising computer-executable instructions that, when executed by the first wireless device, cause the first wireless device to: receive, from the base station, a location of the human based on a location of the first wireless device being within a threshold distance of the location of the human.

Clause 78. The non-transitory computer-readable medium of any of clauses 67 to 77, further comprising computer-executable instructions that, when executed by the first wireless device, cause the first wireless device to: transmit, to the second wireless device, a first capabilities message indicating one or more capabilities of the first wireless device related to participation in the determination of whether the human is present in the environment; and receive, from the second wireless device, a second capabilities message indicating one or more capabilities of the second wireless device related to participation in the determination of whether the human is present in the environment.

Clause 79. The non-transitory computer-readable medium of any of clauses 67 to 78, further comprising computer-executable instructions that, when executed by the first wireless device, cause the first wireless device to: receive a second acknowledgment from a third wireless device indicating that the third wireless device will participate in the coordination and detection procedure; and receive, from the third wireless device, an indication that the third wireless device is terminating participation in the determination of whether the human is present in the environment, wherein the indication is received from the third wireless device within a threshold period of time from reception of the second acknowledgment.

Clause 80. A non-transitory computer-readable medium storing computer-executable instructions that, when executed by a base station, cause the base station to: receive, from a first wireless device, a request for assistance with a detection procedure to determine whether a human is present in an environment of the first wireless device; receive, from a third wireless device, a first time of flight (ToF) and a second ToF between the first wireless device and a second wireless device, the first ToF determined based on a first wireless signal of a first pair of consecutive wireless signals transmitted by the first wireless device and a first wireless signal of a second pair of consecutive wireless signals transmitted by the second wireless device, the second ToF determined based on a second wireless signal of the first pair of consecutive wireless signals transmitted by the first wireless device and a second wireless signal of the second pair of consecutive wireless signals transmitted by the second wireless device; determine whether the human is present in the environment based at least in part on the first ToF and the second ToF; and transmit, to at least the third wireless device, a result of the determination of whether the human is present in the environment.

Clause 81. The non-transitory computer-readable medium of clause 80, wherein the first wireless device and the third wireless device are the same wireless device.

Clause 82. The non-transitory computer-readable medium of any of clauses 80 to 81, further comprising computer-executable instructions that, when executed by the base station, cause the base station to: determine a location of the human; and transmit the location of the human to at least the third wireless device.

Clause 83. The non-transitory computer-readable medium of clause 82, wherein: the first wireless device and the third wireless device are different wireless devices, and the location of the human is transmitted to the third wireless device to enable the third wireless device to transmit the location of the human to the first wireless device.

Clause 84. The non-transitory computer-readable medium of clause 80, wherein: the first wireless device and the third wireless device are different wireless devices, and the non-transitory computer-readable medium further comprise computer-executable instructions that, when executed by the base station, cause the base station to assign the third wireless device as a central device to collect the first ToF and the second ToF from the first wireless device.

Clause 85. The non-transitory computer-readable medium of any of clauses 80 to 84, further comprising computer-executable instructions that, when executed by the base station, cause the base station to: transmit, to at least the first wireless device, the result of the determination of whether the human is present in the environment.

Clause 86. The non-transitory computer-readable medium of clause 85, further comprising computer-executable instructions that, when executed by the base station, cause the base station to: transmit, to at least the first wireless device, a location of the human based on a location of the first wireless device being within a threshold distance of the location of the human.

Clause 87. The non-transitory computer-readable medium of any of clauses 80 to 86, further comprising computer-executable instructions that, when executed by the base station, cause the base station to: receive user assistance information from at least the third wireless device, the user assistance information including one or more capabilities of the third wireless device related to participation in the detection procedure to determine whether the human is present in the environment.

Clause 88. The non-transitory computer-readable medium of any of clauses 80 to 87, further comprising computer-executable instructions that, when executed by the base station, cause the base station to: transmit, to at least the third wireless device, a transmit power threshold and a time duration threshold, wherein at least the third wireless device is permitted to increase transmit power above the transmit power threshold for a length of time less than or equal to the time duration threshold.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless communication performed by a first wireless device, comprising:
   transmitting a request to participate in a coordination and detection procedure to determine whether a human is present in an environment of the first wireless device;
   receiving an acknowledgment from at least a second wireless device indicating that the second wireless device will participate in the coordination and detection procedure;
   transmitting a first set of at least two consecutive wireless signals to the second wireless device;
   receiving a second set of at least two consecutive wireless signals from the second wireless device;
   determining whether the human is present in the environment based at least in part on a first time of flight (ToF) and a second ToF between the first wireless device and the second wireless device, the first ToF determined based on a first wireless signal of the first set of at least two consecutive wireless signals and a first wireless signal of the second set of at least two consecutive wireless signals, the second ToF determined based on a second wireless signal of the first set of at least two consecutive wireless signals and a second wireless signal of the second set of at least two consecutive wireless signals; and
   setting a transmit power of the first wireless device based on the determination of whether the human is present in the environment.

2. The method of claim 1, wherein:
   the request includes an identifier, and
   the acknowledgment includes the identifier.

3. The method of claim 1, wherein:
   the request is received within a threshold period of time after transmission of the request, and
   the first set of at least two consecutive wireless signals are transmitted and the second set of at least two consecutive wireless signals are received after the threshold period of time expires.

4. The method of claim 1, further comprising:
   receiving, from a base station, a transmit power threshold and a time duration threshold,
   wherein setting the transmit power comprises increasing the transmit power above the transmit power threshold for a length of time less than or equal to the time duration threshold.

5. The method of claim 1, further comprising:
   receiving a location of the second wireless device, wherein the determination of whether the human is present in the environment is further based at least in part on the location of the second wireless device.

6. The method of claim 1, further comprising:
   receiving a measurement report from the second wireless device, the measurement report including measurements of the first set of at least two consecutive wireless signals, the measurement report further including sensor information of the second wireless device.

7. The method of claim 6, wherein the sensor information indicates that the human is touching the second wireless device.

8. The method of claim 1, wherein determining whether the human is present in the environment comprises:
   transmitting a request for assistance to a base station;
   transmitting the first ToF and the second ToF to the base station to enable the base station to perform the determination of whether the human is present in the environment; and
   receiving, from the base station, a result of the determination of whether the human is present in the environment.

9. The method of claim 8, further comprising:
   transmitting the result of the determination of whether the human is present in the environment to at least the second wireless device.

10. The method of claim 9, wherein the result of the determination of whether the human is present in the environment is transmitted to at least the second wireless device based on the second wireless device being within a threshold distance of a location of the human.

11. The method of claim 8, further comprising:
    receiving, from the base station, a location of the human based on a location of the first wireless device being within a threshold distance of the location of the human.

12. The method of claim 1, further comprising:
    transmitting, to the second wireless device, a first capabilities message indicating one or more capabilities of the first wireless device related to participation in the determination of whether the human is present in the environment; and
    receiving, from the second wireless device, a second capabilities message indicating one or more capabilities of the second wireless device related to participation in the determination of whether the human is present in the environment.

13. The method of claim 1, further comprising:
    receiving a second acknowledgment from a third wireless device indicating that the third wireless device will participate in the coordination and detection procedure; and
    receiving, from the third wireless device, an indication that the third wireless device is terminating participation in the determination of whether the human is present in the environment,
    wherein the indication is received from the third wireless device within a threshold period of time from reception of the second acknowledgment.

14. A first wireless device, comprising:
    a memory;
    at least one transceiver; and
    at least one processor communicatively coupled to the memory and the at least one transceiver, the at least one processor configured to:
    transmit, via the at least one transceiver, a request to participate in a coordination and detection procedure to determine whether a human is present in an environment of the first wireless device;

receive, via the at least one transceiver, an acknowledgment from at least a second wireless device indicating that the second wireless device will participate in the coordination and detection procedure;

transmit, via the at least one transceiver, a first set of at least two consecutive wireless signals to the second wireless device;

receive, via the at least one transceiver, a second set of at least two consecutive wireless signals from the second wireless device;

determine whether the human is present in the environment based at least in part on a first time of flight (ToF) and a second ToF between the first wireless device and the second wireless device, the first ToF determined based on a first wireless signal of the first set of at least two consecutive wireless signals and a first wireless signal of the second set of at least two consecutive wireless signals, the second ToF determined based on a second wireless signal of the first set of at least two consecutive wireless signals and a second wireless signal of the second set of at least two consecutive wireless signals; and set a transmit power of the first wireless device based on the determination of whether the human is present in the environment.

15. The first wireless device of claim 14, wherein the at least one processor is further configured to:

receive, via the at least one transceiver, a location of the second wireless device, wherein the determination of whether the human is present in the environment is further based at least in part on the location of the second wireless device.

16. The first wireless device of claim 14, wherein the at least one processor is further configured to:

receive, via the at least one transceiver, a measurement report from the second wireless device, the measurement report including measurements of the first set of at least two consecutive wireless signals, the measurement report further including sensor information of the second wireless device.

17. The first wireless device of claim 14, wherein the at least one processor configured to determine whether the human is present in the environment comprises the at least one processor configured to:

transmit, via the at least one transceiver, a request for assistance to a base station;

transmit, via the at least one transceiver, the first ToF and the second ToF to the base station to enable the base station to perform the determination of whether the human is present in the environment; and receive, via the at least one transceiver, from the base station, a result of the determination of whether the human is present in the environment.

* * * * *